US011883343B2

(12) United States Patent
Riener et al.

(10) Patent No.: US 11,883,343 B2
(45) Date of Patent: Jan. 30, 2024

(54) SOFT WEARABLE MUSCLE ASSISTING DEVICE

(71) Applicant: ETH Zurich, Zurich (CH)

(72) Inventors: Robert Riener, Uster (CH); Jaime Duarte, Zurich (CH); Kai Schmidt, Zurich (CH)

(73) Assignee: ETH ZURICH, Zurich (CH)

( * ) Notice: Subject to any disclaimer, the term of this patent is extended or adjusted under 35 U.S.C. 154(b) by 1033 days.

(21) Appl. No.: 16/475,285

(22) PCT Filed: Dec. 21, 2017

(86) PCT No.: PCT/EP2017/084154
§ 371 (c)(1),
(2) Date: Jul. 1, 2019

(87) PCT Pub. No.: WO2018/122106
PCT Pub. Date: Jul. 5, 2018

(65) Prior Publication Data

US 2019/0343707 A1 Nov. 14, 2019

(30) Foreign Application Priority Data

Dec. 29, 2016 (EP) .................................... 16207252

(51) Int. Cl.
*A61H 3/00* (2006.01)
*A61H 1/02* (2006.01)

(52) U.S. Cl.
CPC ........... *A61H 1/0244* (2013.01); *A61H 1/024* (2013.01); *A61H 1/0255* (2013.01); (Continued)

(58) Field of Classification Search
CPC .... A61H 1/024; A61H 1/0244; A61H 1/0277; A61H 1/0281; A61H 1/0262; A61H 3/00; B25J 9/0006
See application file for complete search history.

(56) References Cited

U.S. PATENT DOCUMENTS

| | | |
|---|---|---|
| 6,047,406 A | 4/2000 | Dicker et al. |
| 9,266,233 B2 | 2/2016 | Kornbluh et al. |

(Continued)

FOREIGN PATENT DOCUMENTS

| | | |
|---|---|---|
| CN | 202036370 U | 11/2011 |
| CN | 204766375 U | 11/2015 |

(Continued)

OTHER PUBLICATIONS

Extended European Search Report for EP Application No. 20162193.5 dated Jul. 6, 2020.

(Continued)

*Primary Examiner* — Timothy A Stanis
(74) *Attorney, Agent, or Firm* — Kilpatrick Townsend & Stockton LLP

(57) ABSTRACT

A soft wearable muscle assisting device has at least a wearable body interface and attached thereon elements of active and passive components, adapted to together assist a user in changing or maintaining a position of a first body part articulated to a second body part. The wearable body interface comprises at least two gar-ment portions. The active and passive components comprise at least one actively powered element. The passive components comprise at least a first passive component and a second passive component that both extend between the at least two garment components and comprise elastic material for storing energy provided by the user and/or by the at least one actively powered element. The first and a second passive components are arranged on opposite sides of a joint of the body.

20 Claims, 12 Drawing Sheets

(52) U.S. Cl.
CPC ......... *A61H 1/0277* (2013.01); *A61H 1/0281* (2013.01); *A61H 3/00* (2013.01); *A61H 2201/0173* (2013.01); *A61H 2201/165* (2013.01); *A61H 2201/5061* (2013.01); *A61H 2201/5069* (2013.01); *A61H 2201/5071* (2013.01); *A61H 2201/5084* (2013.01)

(56) References Cited

U.S. PATENT DOCUMENTS

| | | | | |
|---|---|---|---|---|
| 9,289,316 | B2 * | 3/2016 | Ward | A61F 2/70 |
| 9,533,336 | B2 | 1/2017 | Kume et al. | |
| 2009/0042702 | A1 * | 2/2009 | Toronto | A63B 21/0552 482/124 |
| 2010/0185301 | A1 * | 7/2010 | Hansen | A61F 2/70 623/47 |
| 2012/0310126 | A1 | 12/2012 | Bureau et al. | |
| 2015/0321339 | A1 | 11/2015 | Asbeck et al. | |
| 2016/0107309 | A1 | 4/2016 | Walsh et al. | |

FOREIGN PATENT DOCUMENTS

| | | | |
|---|---|---|---|
| CN | 105616113 | A | 6/2016 |
| CN | 105643638 | A | 6/2016 |
| CN | 105662780 | A | 6/2016 |
| JP | 200700391 | A | 1/2007 |
| WO | 2015/088863 | A2 | 6/2015 |
| WO | 2015/157731 | A1 | 10/2015 |
| WO | 2016138264 | A1 | 9/2016 |

OTHER PUBLICATIONS

Third Office Action for Chinese Patent Application No. 201780087020.9, dated Jul. 11, 2022.

MAXX: Mobility Assisting textile eXoskeleton that Exploits Neural Control Synergies by Kai Schmidt and R. Robert Rie-ner, first online Oct. 13, 2016.

Asbeck, Alan T. et al. have published an article "Stronger, Smarter, Softer: NextGeneration Wearable Robots," in IEEE Robotics & Automation Magazine, vol. 21, No. 4, pp. 22-33, Dec. 2014.

Asbeck, Alan T., et al. have published an article "Biologically-inspired soft exosuit." in Re-habilitation robotics (ICORR), 2013 IEEE international conference on. IEEE, 2013.

International Search Report from European Patent App. No. PCT/EP2017/084154 dated Jun. 20, 2018.

Lobo-Prat, Joan, et al. has published "Adaptive gravity and joint stiffness compensation methods for force-controlled arm supports." in 2015 IEEE International Conference on Rehabilitation Robotics (ICORR). IEEE, 2015.

Panizzolo, Fausto A et al. are the authors of "A biologically-inspired multi-joint soft exosuit that can reduce the energy cost of loaded walking" in Jour-nal of NeuroEngineering and Rehabilitation, 13:43, 2016. Lobo-Prat, Joan, et al. have published an article about "Design and control of an experimental active elbow support for adult Duchenne Muscular Dystrophy patients." at the 5th IEEE RAS/EMBS International Conference on Biomedical Robotics and Biomechatronics. IEEE, 2014.

Portema, Eric (2015) have published "Design of the Act in Arm: a novel planar active arm support for assisting people with Duchenne Muscular Dystrophy during table-top tasks" and in, Hyunki et al., "Exo-Glove: A Wearable Robot for the Hand with a Soft Tendon Routing System," in IEEE Robotics & Automa-tion Magazine, vol. 22, No. 1, pp. 97-105, Mar. 2015.

Wehner, Michael, et al. have published an article "A lightweight soft exosuit for gait assistance." in Robotics and Automation (ICRA), 2013 IEEE International Conference on. IEEE, 2013.

International Search Report from National Intellectual Property Administration, PRC; CN Patent Application No. 201780087020.9.

Low-Profile Jamming Technology for Medical Rehabilitation: Web of Science, Timothey M. Simon, Bruce H. Thomas, and Ross T. Smith, University of South Australia; IT Pro Sep./Oct. 2015.

* cited by examiner

SOFT WEARABLE MUSCLE ASSISTING DEVICE

STATEMENT REGARDING FEDERALLY SPONSORED RESEARCH OR DEVELOPMENT

Not Applicable

CROSS-REFERENCE TO RELATED APPLICATIONS

This application claims the priority, under 35 U.S.C. § 371, of International Application-No, PCT/EP2017/084154, filed Dec. 21, 2017, which application claims priority to EU Patent Application No. 16207252.4, filed Dec. 29, 2016; the prior applications are herewith incorporated by reference in their entirety.

FIELD OF THE INVENTION

The present invention relates to a soft wearable muscle assisting device.

BACKGROUND OF THE INVENTION

Weakness of the musculoskeletal system can cause problems that decrease the quality of life of a person. Such a weakness can be the result of genetic disorders, of a neurological condition, such as a stroke, or be due to aging. Due to the weakness, the person may be unable to raise an arm when brushing their hair, to stand up or sit down smoothly, to climb a flight of stairs and so forth.

This can be the case even though the person affected is still able to move the arms or legs or other extremities. That is, at least some of the muscles can be controlled, in contrast to conditions such as complete paraplegia where the person has no control whatsoever over certain groups of muscles. However, even if the muscles or at least some of the muscles a person needs to move a limb are too weak—in particular where the muscles have to maintain a position of the limb against gravity or have to lift part of the body against gravity, such as when having to lift the foot, thigh and so forth during walking —the person maintains the ability to partly control their limbs. Sometimes, such conditions are of a temporary nature only, for example following an accident, where it is necessary to retrain movements using injured muscles. However, even then, the time a person is impaired by the weakness may be quite long. Furthermore, there also many conditions where continuous impairment is to be expected.

Therefore, a need exists to improve the activities of daily life for persons affected by weakness of the musculoskeletal system. This is in particular the case where the inability to support one's own body weight against gravity may cause insecurity when moving about in a community. This can cause a general lack of mobility and thus lead to comorbidities such as joint pain or cardiovascular deficiencies, all derived from an overall reduction in movement.

As another example, stroke survivors who have a hemiparetic arm may choose to stop using the arm since they are unable to use it for activities of daily life. This leads in turn to a phenomenon known as learned non-use—condition whereby the lack of use of the arms leads to a vicious circle and the patient may stop using the arm altogether. These behaviors of reducing or suppressing movement oppose the general approach of physical rehabilitation where movements are performed to promote recovery.

It has already been suggested to provide assistance to persons in the form of powered exoskeletons. These devices apply forces to the user to help with movements such as walking or standing. To this end, rigid structures provided with mechanical joints placed close to the joins of the human skeleton are used. The exoskeletons have electric motors for flexing or extending the joints of the exoskeleton thus transmitting the forces needed for assistance. While such exoskeleton may be of great use to, for example, someone with complete paraplegia, rigid exoskeletons tend to be bulky, heavy, and expensive.

Also, wearing a rigid exoskeleton may be uncomfortable, in particular where the joints of the exoskeleton do not exactly align with the joints of the human body. Also, it may be difficult for a person to get into the exoskeleton, in particular when a person is severely handicapped.

Muscle support for a user has also been suggested in a series of projects initially developed for military applications. These projects which originated from a request by the United States Department of Defense agency DARPA (Defense Advanced Research Projects Agency) sought to develop a technology that would reduce soldiers' musculoskeletal injuries that result from carrying heavy equipment. It was suggested to provide carefully timed, assistive forces to the legs while soldiers carry their equipment. Such devices, known as exosuits, have overcome some of the bulkiness and weight issues of exoskeletons, but the exosuits developed for military purposes are hardly suitable for impaired persons. Military exosuits developed for able bodied, well-trained soldiers can rely on simple position based controllers to provide short bursts of assistance at specific phases of the walking cycle; however, the needs of impaired persons go beyond these bursts.

When the short burst of assistance is timed somewhat incorrectly, e.g. with a timing slightly or significantly out of phase with the exact walking cycle, or when the burst is too weak to fully support the soldier and his equipment, such mistakes will easily be corrected by a soldier due to his well-trained body that overall and nonetheless receives helpful assistance from the military exosuit. In contrast, when assistance is provided to an impaired person and such assistance is too short, too weak or too strong, or is provided with the wrong timing, the impaired person using the exosuit might fail to achieve the movement intended or may even fall.

A further problem is that the transmission of forces to the user of an exosuit relies on high shear forces to provide the assistance necessary. These forces can lead to great discomfort, and may even cause further injuries to the skin or body, especially where a potential user may suffer from sensory issues that prevent the user from feeling such forces or their adverse effects.

Examples of such prior art devices are U.S. Ser. No. 14/893,934 for an soft exosuit for assistance with human motion filed by Walsh, Conor, et al. A further soft exosuit for assistance with human motion was filed by Asbeck, Alan Thomas, et al. as U.S. Ser. No. 14/660,704. Another exosuit was disclosed in U.S. Ser. No. 14/207,233 for Kornbluh, Roy David, et al. The above-mentioned Walsh, Conor, et al. have also filed a patent application for an orthopedic device including protruding members as U.S. Ser. No. 15/025,472. Another prior art is a fitting element with controlled stiffness for Bureau, Maxime, Je Hyung Jung, and Thierry Keller in v Asbeck, Alan T., et al. have published an article "Biologically-inspired soft exosuit." in Rehabilitation robotics (ICORR), 2013 IEEE international conference on. IEEE, 2013, Wehner, Michael, et al. have published an article "A lightweight soft exosuit for gait assistance." in Robotics and Automation (ICRA), 2013 IEEE International Conference on. IEEE, 2013. Asbeck, Alan T. et al. have published an article "Stronger, Smarter, Softer: NextGeneration Wearable Robots," in IEEE Robotics & Automation Magazine, vol. 21, no. 4, pp. 22-33, December 2014. Panizzolo, Fausto A et al. are the authors of "A biologically-inspired multi-joint soft exosuit that can reduce the energy cost of loaded walking" in Journal of NeuroEngineering and Rehabilitation, 13:43, 2016. Lobo-Prat, Joan, et al. have published an article about "Design and control of an experimental active elbow support for adult Duchenne Muscular Dystrophy patients." at the 5th IEEE RAS/EMBS International Conference on Biomedical Robotics and Biomechatronics. IEEE, 2014. The author Lobo-Prat, Joan, et al. has published "Adaptive gravity and joint stiffness compensation methods for force-controlled arm supports." in 2015 IEEE International Conference on Rehabilitation Robotics (ICORR). IEEE, 2015. Finally, Portema, Eric (2015) have published "Design of the Act In Arm: a novel planar active arm support for assisting people with Duchenne Muscular Dystrophy during tabletop tasks" and In, Hyunki et al. "Exo-Glove: A Wearable Robot for the Hand with a Soft Tendon Routing System," in IEEE Robotics & Automation Magazine, vol. 22, no. 1, pp. 97-105, March 2015.

Reference is also made to the following documents "MAXX: Mobility Assisting textile eXoskeleton that Exploits Neural Control Synergies" by Kai Schmidt and R. Robert Riener, first online Oct. 13, 2016 as extended abstract.

SUMMARY OF THE INVENTION

An improved soft wearable muscle assisting device suitable for activities of the daily life and sufficiently comfortable to be used in a variety of situations, and can easily be adapted to different users and/or changing medical conditions of a given user.

It should be noted that throughout the description, reference is frequently made to e.g. a user moving his (rather than her) muscles. This is to simplify reading. It is not to imply that the device of the present invention is to be used for male users only. This being noted, it will be understood that the device of the present invention can be used for both male and female persons and that the persons can be adults, adolescents or children.

Accordingly, in a first aspect of the invention, a soft wearable muscle assisting device has at least a wearable body interface and attached thereon elements of active and passive components adapted to together assist a user in changing or maintaining a position of a first body part articulated to a second body part. The soft wearable muscle assisting device further comprising at least two garment portions; the active and passive components comprising at least one actively powered element, the passive components comprising at least a first passive component and a second passive component that both extend between at least two garment components and comprise elastic material for storing energy provided by the user and/or by the at least one actively powered element; for such a suit it is suggested that the first and a second passive components are arranged on opposite sides of a joint of the body.

In this manner, the soft wearable muscle assisting device of the present invention, having passive components comprising elastic material by exerting an additional torque (or by pulling at the body part), will not only support the muscles that move the body but will also help where ligaments of the body are weakened due to injury, learned non-use of certain groups of muscles of the body and so forth. These conditions not only affect the muscles themselves but in the long run may lead to incorrect postures resulting in pain, extensive wear of body joints and so forth.

Thus, providing not only a single passive component at a joint that extends between garment components of the wearable body interface, but rather at least two passive components so that they can be arranged on two opposite sides of the joint allows to assist both the muscle when positioning the first body part and the ligaments of the body that, as indicated, are often impaired as well.

Therefore, the risks and results of learned non-use are counteracted and also, the muscles of the human body may move the body part in a manner more closely corresponding to the motion of a healthy human being, even where some muscles or muscle groups of a user are weak or dysfunctional.

This may also allow to use reduced assistance resulting in the reduction of actuator size, battery size and so forth and hence weight and cost of the device.

It should be noted that the wearable body interface may have direct contact to the skin of the user or that the wearable body interface may be worn above underwear, above clothes and the like. Wearing a body interface directly on the skin may be preferred as it avoids irritation of the user by wrinkles of clothing between the wearable body interface and the skin.

Also, it might be easier to hide at least certain components of the soft wearable muscle assisting device if it is worn below conventional (albeit, if necessary oversized) clothing. This is preferable for certain users.

However, having no direct contact between the skin of the user and the body interface may also be preferred, for example because this allows the user to wear underwear or the like so as to allow for frequent laundry, adaption to varying ambient temperatures and so forth.

The wearable body interface may have the general form of a piece of clothing such as a trouser or a shirt, but the wearable body interface need only cover part of the portions of the body a shirt or trouser usually covers.

The body interface may comprise one or more plies of textiles, woven material, functional material, plastic sheets and so forth. Therefore, the body interface will in some parts of the description be referred to as a layer, a garment layer, a base layer and so forth.

Regarding the garment portions, it is noted that each garment portion may compromise fabrics made of natural or artificial fibers, woven or knitted material or felt, leather and so forth. The term garment is used herein in view of the fact that where the soft wearable muscle assisting device has a body interface that covers sufficiently large portions of the human body, it will have an appearance and/or function of an entire piece of clothing such as a trouser or a shirt. However, it will be obvious to the skilled person that the term "garment" or the like should not be restricted to refer only to an entire piece of clothing rather than sections thereof should this be preferred for a given user.

Also, it should be noted that while the wearable body interface comprises at least two separate garment portions, for example to provide an interface at both the thigh and the shank, or between the upper arm and the forearm, it is possible to provide both portions of garment in one single piece, e.g. because these pieces are sewn together. Accordingly, it is possible to provide a body interface that a user can put on easily and frequently with little or no assistance.

It should be noted that where it is not sufficient to provide a user with assistance to one or both legs only, or one or both shoulders or arms only, but rather support for at least one arm and at least one leg is needed, the wearable body interface may comprise two pieces. For example one piece for the upper body assisting the shoulders and/or the arms while another piece of the wearable body interface may be used for assisting one or both legs.

Here, while it may be easier to have separate pieces for the wearable body interface, it is still possible to have one common unit comprising a control and active components that will be connected to respective pieces of the body interface that can be put on separately. For example, the body interface could comprise a trouser-like piece comprising the at least two garment portions between which first and second passive components extend as well as a second shirt-like piece which also has two garment portions united into one sleeve so that one garment portion is provided close to the upper arm whereas the other garment portion is provided in the forearm with another pair of first and second passive components extending between those two garment components as well.

An active component having e.g. four motors for assisting the left leg, the right leg, the left arm and the right arm, might have but one battery and one common control which is provided e.g. on a rigid plate wearable at for example the back of the user, preferably above the wearable body interface and which is connected to the other parts of the soft wearable muscle assisting device to transmit forces between the actuators, sensor signals to and/or from the control and, if necessary, power to sensor devices provided in the respective parts of the body interface. It will be understood that such a common control/battery-arrangement can be used with 1 or more actuators. It will also be understood that placing such a common control/battery-arrangement at the back is preferred as this is most comfortable for most users, but that placing a common control/battery-arrangement elsewhere is possible as well, e.g. in front of the belly, a shin asf.

Even where such (back) plates with a control circuitry and preferably motors or other powered actuators is rigid, the muscle assisting device will in contrast to an exoskeleton still be considered soft as it is possible to move the joints, in particular joints of the limbs of the user, without being affected by joints of the assisting device as would be the case with an exoskeleton.

In a preferred embodiment, the first body part the soft wearable muscle assisting device is to assist in changing or maintaining its position is a limb. In this case, the at least two garment portions may comprise at least one garment portion that in use has a position generally distal of the joint while at least one other garment portion in use is provided at a position non-distal of the joint.

Where the body part is a leg or an arm, the joint may be the hip or the shoulder. In case the body part is an arm and the joint is the shoulder, the one garment portion that in use is at a position generally distal of the joint may be placed at the upper arm or the forearm. If the body part is a leg and the joint is the hip, the one garment portion that in use is at a position generally distal of the joint may be placed e.g. at the thigh. In both cases, the other garment portion may be arranged to directly interface the torso of the user (and thus non-distal of the joint).

In other cases, where the soft wearable muscle assisting device is used for example to assist in extending a leg and thus a first body part is the shank articulated at the knee to a second body part, namely the thigh, one garment portion may be provided at either an ankle, the foot or the shank itself while the other garment portion may be provided proximal of the knee, that is interfacing the thigh.

In a preferred variant, the first and second passive components extend along the joint such that part of each passive component is on one side of the joint e.g. in front of the joint so that one movement extends the first passive component while the same movement reduces the extension of the other passive component which is arranged e.g. at the back of the joint. Accordingly, both the first and second component will exert a torque on the joint. This need not be the case for the entire range of possible joint angles and will depend on any pretension of the elastic material the first and second passive component may comprise. It should be noted that it is not absolutely necessary that the second and first components are both pre-tensioned in such a manner that a torque is exerted for the whole range of possible joint angles by each of the first and second components.

Rather, it would be possible that either the first or second passive components are slack for a given part of the flexion range, that is when the joint is almost fully extended or when the joint is almost fully flexed.

However, it will generally be preferred if for at least a major part of the range of possible joint angles, both the first and the second component simultaneously exert a torque on the joint. For example, both passive components may be pre-tensioned such that one of the first and second passive components exerts a flexing torque while the other of the second and first and second component exerts an extending torque on the joint. In this case, the overall torque of the first and second passive components will not balance, at least not for the entire range, but a net torque in one direction is exerted on the joint in the preferred embodiment.

Typically, a net torque will be provided by the two passive components for a net joint flexion assistance. This is particularly helpful, as with the majority of patients, the active component of the soft wearable muscle assisting device is needed to assist joint extension. For example, when the upper arm is raised from the vertical into a horizontal, the shoulder joint between the arm and the torso is extended. In a similar manner, a person sitting usually has flexed knees, whereas getting up extends the knees so that again joint extension is needed for assisting getting up from a chair. The same holds for the hip that is more flexed in the seated position and more extended when standing. Also, if a person is bent forward and needs assistance to straighten up, the lines of the vertebra of the back may need to be somewhat extended as well. Then, it is noted that in walking, raising a foot from the ground in a normal, slow walking gait to be expected for a user having impaired muscle activity requires straightening of both the hip joint and the knee of the standing leg far enough so that the sole of the other foot can easily be removed from the ground. Therefore, walking assistance also relies on joint extension. It will be noted that the activities given above all lift some body part at least a bit; thus the assistance provided can be considered to be anti-gravity assistance. Also, even where a body part e.g. an arm is only kept in a raised position with the help of the device or collapse of the person is prevented e.g. when sitting down, anti-gravity assistance is provided as well.

As can be seen above, it is advantageous if at least one active component is adapted to assist joint extension. This is easily achieved if the active component comprises a tendon that exerts a force or torque on some part of the body to change its position.

The tendon will usually be guided along the soft wearable muscle assisting device from the actuator to a point or an area where the force is to be applied and the actuator will usually be used to pull at the tendon. Now, it is particularly preferred if the net assistance provided by the first and second passive components together is antagonistic to the force the tendon(s) of the at least one active component provide for joint extension. In other words, while the active components most frequently will provide assistance to joint extension, the net result of the passive components typically provides for flexion of a joint extended as needed by an active component.

In this way, simply by reducing the assistance by the active component and/or by completely releasing the active component so that the body part may come to the rest position, the passive components will help in repositioning the respective body parts providing an antagonistic force.

It is possible to use the soft wearable muscle assisting device of the present invention to help positioning a body part at a given horizontal position. For example, if the user is capable of lifting his arms, there nonetheless is the possibility that he cannot move his arms from a horizontal position at the side of his body to the front of his body. If such a movement is impaired, the soft wearable muscle assisting device of the present convention may assist the motion described.

However, it is to be anticipated that in most cases the user will have problems in lifting an arm, raise from his seating position or straighten up his body enough to start walking. In these typical cases, the muscles will be too weak to lift the body or body parts against gravity so that the soft wearable muscle assisting device will be used to assist in changing the position of a body part against gravity. However then, the problem not only exists in lifting a body part against gravity but also to maintain the position of the body part despite gravity.

For example, if the user intends to comb his hair, he usually needs to raise the arm and to maintain the arm at a lifted position while combing. While this does not pose a significant problem for the healthy user, this may be too difficult for a person having a muscle weakness. Therefore, the soft wearable muscle assisting device in a preferred embodiment may be adapted to support the body part at a given or at certain positions thereof against gravity.

It will be understood that the soft wearable muscle assisting device of the present invention having a guided tendon and an actuator for the tendon and which is adapted to assist in changing the position of the first body part against gravity may also be used to maintain the position of the first body part against gravity. Here, it would be possible to simply stop the movement of the actuator for maintaining the length of a tendon as is while stopping.

Stopping the actuator may be done by passive means that is for example mechanical locking against further movement or by applying continuous power to the motor.

In a highly preferred embodiment, the actuator will wind up the guided tendon, and the tendon will be guided in a manner such that winding up the tendon extends at least one joint. This allows to use simple motors having a rotating shaft as actuators. In this case, if the tendon used for flexing the joint when the active component is activated is allowed to unreel, a force will be exerted on the tendon by at least one of the weight of the body part articulated at the joint, and/or additional body parts and/or by the nonzero sum of torque on the joint provided as net torque by the common action of the first and second passive components.

The tendon may be allowed to unreel in a controlled manner, for example when the user sits down. Here, tendon tension will be slowly reduced, and the tendon will unreel slowly, preventing that the user suddenly collapses on the seat. Also, it will be understood that although only extension of the joint will be actively supported, movement in both directions, that is flexing and extending the joint will be sufficiently fast to be acceptable for the user.

It is possible to have a tendon that splits into several tendons. In this way, it is for example necessary to reel up only one tendon for extending the knee, but to guide the tendon in two parts along the knee, namely a first part along the left side of the knee joint and the other tendon part along the right side of the knee joint. The same could e.g. be done for the elbow.

In other words, at least one active component comprises at least one tendon which is guided on one side of the body in view of the sagittal plane, and is separated into two portions guided to opposite sides of the coronal plane.

The tendon may be attached to the body interface, may reunite, for example to form a loop placed around e.g. a part of the human foot or may even be redirected to the opposite side of the sagittal plane which allows for example to attach the tendon at a foot or the ankle or the shin having passed the knee.

By cascading the tendon into multiple tendon ends, in particular such that they are split before reaching the joint and then guided along the joint on either side thereof, the pressure on the joint itself is reduced and also, the arrangement would be more stable with respect to mechanical stability.

It should be noted that it is possible to adapt the soft wearable muscle assisting device to support movements that require simultaneous adjustment of a plurality of joint angles in a manner using fewer activators than joints. For example, it is possible to use one single actuator for extending both the hip and the knee. It will be understood that reducing the number of actuators will reduce the cost, weight and complexity of the soft wearable muscle assisting device leading to a larger number of users using the soft wearable muscle assisting device of the present invention more often.

It is therefore preferred if the soft wearable muscle assisting device according to the present invention will be adapted to assist a change of position or maintain a position of a leg. Where the tendon is guided generally in front of the knee but generally behind the back of the hip, stretching bands as passive elements can be provided behind the knee and stretching bands as passive elements for the hip can be provided in front of the person. It should be noted in this context that it is not absolutely necessary to provide stretching bands as passive elements but that the passive elements could also compromise e.g. stretchable strings.

However, broad bands are preferred because the pressure they exert against the device and thus the body of the user will be more evenly distributed and also they will be more comfortable, for example if the user sits down. A typical broad band may have a width between 1 cm and 10 cm, preferably between 2.5 cm and 7 cm.

In the most preferred cases, the soft wearable muscle assisting device will provide assistance to muscles changing or maintaining the position of an arm or a leg. In these cases, the limb assisted will have a longitudinal axis. The tendon most frequently will be attached somewhere to the torso (or, more precisely, to a base layer placed at the torso). In such a case, the tendon will run along the main direction of the longitudinal axis of the corresponding portion of the limb, and given that the tendon must be moved relative to the limb when reeling-in the tendon, the tendon will be gliding in this direction.

The first and second passive components that comprise elastic materials for storing energy may comprise stretching bands and/or be built by stretching bands attached in use to the body interface. Using stretching bands for the first and second passive components offers the same advantages as explained above, but it will be understood by the skilled person that springs, stretchable strings and the like may also be used.

In a highly preferred variant of the soft wearable muscle assisting device of the present invention, care is taken to reduce shear to the tissue the user experiences when using the soft wearable muscle assisting device. With respect to shear, it is noted that the tendon of the active component will under some conditions exert a pulling force that needs to be applied to the human body, or more precisely the body interface. Note that the inner parts of a limb or other body parts closer to the skeleton usually will be less affected by such external forces that is they will move less, so that a motion of the outer parts of the human body relative to the inner parts thereof may occur if forces are applied to the skin. This is referred to as shear and it will be understood that the comfort in using the soft wearable muscle assisting device of the present invention might suffer from this effect.

Accordingly, it is preferred in any soft wearable muscle assisting device to reduce the effects of shear. The present invention even in the most general form having the first and second passive components arranged on opposite sides of the joint of the body and extending between the at least two garment components has the advantageous effect of exerting forces on different portions of the body, for example pulling forces on several sides of the joint. Even given that in the preferred embodiments of the invention, the forces or torques exerted by the first and second passive components will be different from each other, this contributes to an overall more homogeneous distribution of forces close to the joint and thus reduces unpleasant experiences of a user due to shear. In addition, it is preferred if at least one of the garment portions surrounds at least part of the limb.

Then, constricting elements may be provided in the preferred embodiment constricting the respective garment portion. The garment portions need not surround the limb portion fully and may for example cover only part thereof. By leaving a portion of the limb circumference uncovered, more transpiration is allowed, certain medical examinations become possible and so forth and it would be easier to put on the soft wearable muscle assisting device. However, the distribution of forces may become more uneven, resulting in shear.

It is possible to cover the entire circumference of the limb by the garment portion using hook-and-pile fasteners, e.g. Velcro fasteners, in a region of overlapping garment. If at least one of the garment portions surrounds a portion of the limb at least partially, e.g. more than half of the circumference, preferably at least two thirds thereof, it is possible to provide constringent elements that tighten the fit of the garment portion around the limb. This evens out adverse effects such as shear even more.

Basically, it would be possible to simply tension the constringent elements once the user has put on the soft wearable muscle assisting device. This can be done to some extent. However, if the constringent elements are too strong, this will be uncomfortable to the user even without shear, and it will also restrict blood flow through the limb. This would be particularly disastrous where the sensory functions of the user are impaired and/or wherein the user cannot communicate discomfort or adjust the soft wearable muscle assisting device himself.

Therefore, in a particularly preferred embodiment, it is highly preferred that the constringent elements are designed in a manner to reduce such adverse effects. To this end, constringent elements can be embedded into the garment portion itself, in particular as an integral part of a textile fabric. The constringent elements can be detachably or fixedly connected to passive force components which allows to tighten the constringent elements around the limb if the force exerted by the passive force component increases. Also, it would be possible to connect the constringent elements to the active tendons or to a part of the active components.

From the above, it will be understood that in the preferred embodiment, where a tendon of the active component runs along the longitudinal axis of the limb, a constringent element may be oriented generally perpendicular to the longitudinal axis of the limb so as to maintain the position of the garment portion in use. It should also be noted that the constringent element may be pre-tensioned to a certain level and that it would be possible to use a buckle-like belt as a constringent element.

Then, it is noted that other possibilities exist to reduce the adverse effects of shear for a user. These other possibilities can be used in addition to the suggestions described above and/or can be used separately thereof.

It is noted that in the preferred embodiment, glide plates may be provided between the body of the user and the tendons. This will reduce friction of the tendons, reduce wear and discomfort caused by heat production and will even out the pressure caused by the tendons. It is possible to guide an active tendon at least for part of its length along a zigzag pattern, in particular such that—similar to a shoelace—pulling at the tendon pulls together two ends of the garment portion or elements movable on a gliding plate, which helps in tightening the garment around the limb.

It should be noted that the soft wearable muscle assisting device usually will be considered to be more comfortable the softer the device is. For example, while the user is in a relaxed position, with only slight movements of his body, where he is able to move without assistance, the wearable muscle assisting device should be as soft as possible. In contrast, where assisting the user is necessary, the device may not be so soft as to impair assistance.

Therefore, it is highly preferable if the stiffness or softness of the soft wearable muscle assisting device will depend on the current use thereof.

It is also highly preferred if the overall stiffness of at least a part of the soft wearable muscle assisting device may change over time. This can for example and in the preferred embodiment be achieved by the body interface comprising a plurality of layers or plies that together are adapted to change the overall stiffness. If a multi ply arrangement has plies that glide relative to each other, the body interface would give a soft impression having a rather low stiffness. In contrast, where the plies have a strong interaction with each other that is they do adhere or stick to each other, are strongly attracted to each other, have rough surfaces facing each other and so forth, it will not be possible to bend or deform the plies independently and the overall stiffness will be much higher.

It should be noted that it is possible to induce so-called layer jamming, (using the conventional technical term "layer", although the body interface may be considered to have plies rather than layers).

Further to a plurality of layers that allow to change the overall stiffness of at least part of the soft wearable muscle assisting device, and/or as an alternative to this, it is possible that the body interface comprises one or more constringent element adapted to tighten automatically, in particular if an active tendon is pulled at or a pulling force is exerted when the tendon is reeled up.

Also, it should be noted that where a body interface is provided with one or more plates, in particular an anisotropic plate, these can also be used to transform shear forces into normal forces, and that shear forces can be reduced when applying forces that are effective in a direction helping to position the body part, that is typically helping in extending a joint.

It should be noted that the passive components comprising the elastic material and storing energy may be arranged close to at least one of the hip, the ankle joint, the shoulder and/or the elbow. These elastic materials can be pre-tensioned, for example during the previous movement of the body part, for example for flexion of the associated joint. Then, when assistance is required by the user wearing the soft wearable muscle assisting device of the present invention, for example while extending a joint, they may perform work on the body.

Releasing energy while assisting the user in positioning the body part against gravity thus helps compensating for the weight of an associated leg or arm, reduces the energy consumption of the device, or reduces the necessity to provide particularly large batteries, reduces the thermal load on an electrical circuitry and/or on electrical motors and so forth.

It should be noted that at least some active components usually will be arranged to assist those muscles that move or maintain a body part against its own weight or the weight of another articulated body part. For example, where assistance is provided to lift the upper arm, it may be necessary to take into consideration the additional weight of the hand and the forearm.

As has been indicated above, use of the soft wearable muscle assisting device is not restricted to a case where a first body part is directly articulated to the second body part via one joint only. For example, where major assistance needs to be given in the movement of a shank or lower leg, because the muscle groups moving the lower leg are particularly weak, it might still be helpful and reasonable to help the user of the soft wearable muscle assisting device of the present invention to change or maintain both the position of the lower leg as well as the position of the thigh.

Where the active component is also adapted to change or maintain the angular position of both the knee and the hip, it is preferred to use one actuator only. The same soft wearable muscle assisting device can be used for a first group of patients needing assistance only for the lower leg and for a second group of users needing assistance to move both the lower leg and thigh.

In a highly preferred embodiment, the tendon is guided in one or more low friction sheaths at least some of which are partially attached to at least one of the garment portions. In other words, the sheath will be fixed to the garment portions in a manner that defines where the tendon extends. Thus, by connecting the sheaths to the garment portion, it is easier to put on the exosuit or soft wearable muscle assisting device of the present invention. Also, the tendon will easily stay in the right place.

In a highly preferred embodiment, the tendons are guided in slack sheaths, at least some of which are preferably at least partially attached to at least one of the garment portions. Using a slack sheath is possible because the tendon only needs to be pulled and no pushing forces need to be transmitted from the actuator to an end point at the body part to be moved.

In other words, it is not necessary to use a bowden cable common for other exosuits. Such a bowden cable is rigid and hence typically a source of discomfort. Using a tendon that only provides assistance in one direction, that is by pulling, is possible in particular due to providing both active and passive components, the passive components in preferred embodiments being able to provide forces antagonistic to the effect of the activated tendon. It is possible and preferred to provide a rigid carrier plate for at least one of the actuators and/or for a battery for the at least one actuator. Both the actuator and the battery are rather heavy, having a density higher than the garment or other parts of the soft wearable muscle assisting device of the present invention. Accordingly, the weight and any pressure against the body of the user should be evenly distributed over a large area in a preferred arrangement. This can be achieved using the aforementioned carrier plate.

In a highly preferred embodiment, the actuator is an electrical motor. Using electrical motors saves weight and costs. In the preferred embodiment, one actuator control is provided that is arranged to activate one or more actuators in response to signals derived from a sensor arrangement. This sensor arrangement will be adapted to generate signals indicative of at least one of an angle of the joint present between the first body part and the second body part. Where more than one joint between the first body part and the second body part is present, the angle of a plurality of joints or each of the joints may be determined. Furthermore, it is possible to measure either an absolute angle or a change in an absolute angle of the joint. Furthermore, it is possible to measure an absolute movement of the first body part and/or to measure a movement of the first body part relative to the second body part. It will be understood that where the movement of the first body part relative to the second body part is to be measured, it may be necessary or helpful to provide a plurality of sensors, with at least one sensor being provided at the first body part and another sensor being provided at the second body part.

Also, it might be possible to not simply measure the movement of the first (assisted) body part, but to derive signals for the control of the actuator from the movement of other body parts, for example in order to detect whether or not the trunk of a user is swaying.

Then, it is possible to detect a pressure on the part of the body related both to the movement or position and/or position of the first body part. For example, where the soft wearable muscle assisting device of the present invention serves to assist a user in walking, a pressure distribution on the foot sole may be detected. This can be used to identify whether or not the foot is currently lifted from the ground, whether a constant pressure is observed or not, a constant pressure or constant pressure distribution indicating that the user stands at rest.

If a measure of the overall pressure on one or both foot soles can be derived, it is possible to distinguish whether or not a given user has his feet on the ground, if he is sitting or if he is standing.

Also, identifying the pressure distribution and/or identifying that a pressure exceeds certain thresholds, it is possible to identify and distinguish certain phases of standing up, sitting down, standing or walking.

It is noted that in a particular preferred embodiment, where the soft wearable muscle assisting device is used for assisting in walking in a manner assisting lifting a foot from the ground, assistance in lifting the foot from the ground is preferably only provided in case the other foot has been determined to have sufficiently firm contact to the ground.

This is particularly helpful where interpretation of sensor signals is difficult and clear understanding of the current posture of a user must be obtained before actuating and/or releasing the actuators so as to prevent the user of from falling, collapsing on a chair while sitting down and so forth.

Also, it will be understood that a sensor arrangement comprising a plurality of sensors producing different sensor signals relating to different body parts, to different parameters and so forth can be helpful to identify the posture and thus control the actuator in an appropriate manner.

Where a sensor arrangement having a plurality of sensors, and having furthermore corresponding signal conditioning circuits as well as one or more analog-to-digital converters, the actuator control can be implemented using a digital circuitry, for example as software for a microcontroller arrangement.

The sensor arrangement can be construed and understood to be a sensor array, albeit it will be understood by the skilled person that it is not necessary to arrange the sensors in precise columns, rows and so forth.

Also, it is possible to use a sensor arrangement having a multitude of different sensors, for example at least two from different element from the group of motion sensors, 3-axis accelerometers, inertial measuring units (IMUs).

It will be understood that while sensors producing a good signal to noise ratio under reproducible conditions, a large uncertainty in identifying a current position or posture of the user may remain, in part due to the soft wearable muscle assisting device being soft and the sensors being attached at a soft and thus moving part of the suit. Accordingly, the possibility exists that any sensor measurement is adversely affected and hence care must be taken to correct for such variations. Nonetheless, it is particularly preferred if the suit is used for a variety of tasks and activities of daily living and thus the control circuit is preferably adapted to identify a given stride, stance, posture and the like, and to identify a stance or swing phase during walking with high certainty in response to sensor signals.

It should be noted that in order to identify one of a plurality of different activities a user can be assisted in while wearing the soft wearable muscle assisting device of the invention, and/or in order to identify a phase of an identified cyclic movement, it is preferred to detect zero-crossings of the angular velocity of certain parts of the body such as the thigh, the shank, the leg, the hip joint or the knee, and/or to detect zero-crossings of the angular velocity of a combination of such body parts.

It will be understood that in order to avoid misinterpretation of data derived in such a way, a zero-crossing may be assumed to have occurred only if the angular velocity attained after changing the sign of the angular velocity is sufficiently different from zero angular velocity. This preferred way of detection avoids problems from multiple crossings at certain walking speeds, multiple zero-crossings due to oscillation and swaying and so forth. It should be noted that the soft wearable muscle assisting device of the present invention preferably has a control that can be adapted to store allowed predetermined upper and lower angles for a given joint and is adapted to compare sensor information indicative of a current joint angle or joint angle change with said stored upper and lower allowed joint angles so as to prevent the activation of the actuator in a manner causing harm to the joint. It will also be understood that it is possible to define a model of a body part, for example the leg, and to derive different allowed or useful joint angles for any given phase or period during a gait cycle (or, more general, moving cycle) so that the control can be adapted to energize the actuator in response to these varying upper and lower angles for one or more joints determined from a specific model. Such model derived ranges can be stored prior to use or be calculated on the fly to determine current allowed upper and/or lower joint angles.

According to another aspect of the invention and in a preferred embodiment thereof, a soft wearable muscle assisting device is suggested having at least one element controllable via electrical signals during assistance to a user, a sensor component adapted to provide signals indicative of a need of a user for assistance, a control adapted to provide electrical signals during assistance in response to signals provided by the sensor component and indicative of a need of a user for assistance. Such soft wearable muscle assisting device is arranged such that the sensor component comprises at least a first and a second sensor, both adapted to provide sensor signals indicative of at least one of an absolute orientation of a limb or a part of a limb, an orientation of a limb or part of a limb relative to another part of a body, a joint angle, a position, velocity or acceleration of a body part, the first and second sensors spaced apart from each other such that in use either at least one joint is present between the first and second sensor or the first and second sensor are provided at neighboring joints; and in that signal conditioning circuitry is provided arranged to input at least two streams of respective sensor signals into the control, the first stream of sensor signals providing during a cycle of movements of a body part at least 10 different values of sensor signals in response to sensor signals from the first sensor and the second stream of sensor signals providing during a cycle of movements of a body part at least 10 different values of sensor signals in response to sensor signals from the second sensor, the control being adapted to identify a current need for assistance in response to the at least two streams of sensor signals by evaluating during the cyclic movement a plurality of values from both streams.

Evaluating signals from different sensors helps to identify an activity of daily life the user currently is involved in. Furthermore, evaluating streams rather than single values enables identification of a phase of an activity a user is currently involved in. It also allows identification of a deviation from a typical progress of the activity. For example, it can be easily detected that a user stops in a motion or that a user suddenly reacts during the movement, e.g. to evade a bicycle when walking on a street. Identifying such deviations with the help of data streams allows to react very fast.

Typically, the data streams will have a sample rate of at least 10 Hz. This is sufficient to coarsely estimate e.g. a gait phase. However, a higher sample rate is preferred and typically, a 50-100 Hz rate is preferred. In particular, where zero crossings are considered, the higher sample rate allows to better distinguish a true zero crossing from a mere fluctuation around zero without the need to wait a prolonged period or to react prematurely. A sample rate higher than a few 100 Hz, such as higher than 400 Hz usually does not bring any advantage in identification of an activity.

Where joint angles are determined directly using suitable sensors such as IMUs or indirectly from other measurements, it is possible to consider the angles themselves, angular velocities, zero crossings of the angular velocities and/or angular accelerations. A sufficiently high sample rate allows calculation of both angular velocities and angular accelerations with sufficient precision. It should be noted that the identification of a specific activity or the identification of a specific phase of an activity need not rely on only one of e.g. angular velocities, zero crossings of the angular velocities and/or angular accelerations. Rather, it has been found that where the angular velocities of joints or limbs are detected to have small values, it is preferable to use the absolute angle instead. In this way, the determination of a specific activity or phase thereof does suffer less from oscillations of sensors and the like caused for example where a sensor is attached to a thigh that budges due to tensioning of underlying muscles. It will be understood that when measuring with a sensor attached close to the shin, less variability will be observed.

However, even when using sensors attached close to the tibia, the sensor signal might be impaired due to e.g. a touch down impact of the foot. Also, it should be noted that specifically when a current activity is to be identified a user has begun using his own muscles, such identification should be done as soon as possible in order to provide adequate assistance already during an early phase of a cyclic movement.

Here, despite the fact that sensors attached at the thigh, in particular sensors sensing an angular displacement, an angular velocity or an angular acceleration, are prone to produce signals subject to a higher variability, attaching sensors at the thigh is advantageous because the thigh will experience greater variations of its orientation during early phases of a stride. Therefore, for a soft wearable muscle assisting devices of the present invention used for assisting an activity involving the legs such as walking, sitting down on a chair, getting up from a chair, standing, ascending or descending stairs and the specific preferred controls for such soft wearable muscle assisting devices, it is generally preferred if at least one sensor is providing a signal indicative for at least one of an angle (e.g. relative to the ground or the hip) or orientation of the thigh or an angular velocity or an angular acceleration thereof. Also, given that such signal is subject to great variability, it is preferred to filter the signal and/or to detect crossing of certain thresholds such as zero crossings.

Filtering may be done with filters having no or little delay, such as butterworth filters. A delay is considered sufficiently small for the purpose of the present invention if it is short vis-á-vis the length of a cyclic activity and/or the length of an active support phase theoretically possible with a given arrangement during this cyclic activity. The possible active support phase is the phase during which the given actuators may actually perform work in the physical sense. It will be understood that a soft wearable muscle assisting device having a restricted number of active actuators may be used to perform work during only specific parts of an activity cycle, for example when lifting a leg, while the given mechanical arrangement of the soft wearable muscle assisting device does not allow to perform work during other phases using the active components thereof.

Typically, the possible active support phase will last for at least 10% of the length of a cyclic activity, such as a stride, and preferably the support phase lasts for at least 15%, in particular for at least 20% of the phase. Therefore, the delay should not last longer than 10% of a stride, 7.5% of a stride or 5% of a stride when walking is supported or 10%, 7.5%, or 5% if another cyclic activity supported.

It should be noted that for different activities, different forms of support are needed, that is, the timing and/or strength of the forces applied by different actuators and/or components will be different. Once a specific cyclical activity has been identified by referring to signals from a plurality of sensors such as motion sensors, IMUs and the like, the support needed can be predicted based on a model, preferably a model taking into account certain parameters specific for a given users, such as body size, size of body parts (such as length of shin and thighs), health conditions such as coronary problems, breathing problems, general fitness, and based on this model, the control can generate and output adequate signals for controlling actuation of the actuators. The output of the control that, based on sensor signals has identified that the user is currently involved in a certain activity, such as walking, can be such as to supply the assistance as needed according to a model for following cycles but the control will continuously check whether based on current conditioned sensor signals inputted into the control the support needs to be changed, e.g. because the user accelerates/decelerates, starts to climb a stair asf. Also, it is possible to trigger support for a new cycle only once a certain condition has been met. For example, when providing assistance in walking, it is advisable to start support of a new stride only once it has been detected that the user has put the foot previously lifted from the ground during a swing phase of the stride firmly back onto the ground so as to avoid hazardous situations.

Thus, it will be understood that assistance during an initial cycle of a cyclical activity might be slightly different from an assistance provided during cycles subsequent to the identification of the specific activity and the identification and selection of an appropriate model or the determination of modeled parameters relating to the activation of the actuators. A detection delay may be considered short if the conditions are met at least for subsequent cycles.

It will be noted that in a typical and preferred embodiment, the support, e.g. by a pulling force applied to a tendon exerting a torque, may be controlled during the support phase by not simply switching an electrical motor used as an actuator on or off but by varying the torque generated by the motor in a controlled manner gradually, (that is, where a digital control is implemented, via at least 2 different intermediate steps, preferably via at least 4 intermediate steps,), varying the torque (or motor power) between a nonzero and zero support for at least some time such as 25%-33% of the active support time. In this manner, the user does not experience jerklike support, thus increasing the comfort of use. It should be noted that to do so, the actual phase of a cyclic movement should preferably be known. Also, in particular where a user having a handicap is to be assisted, care should be taken to allow for reaction to unpredicted events, such as encounter of (even minute) obstacles, tumbling, unexpected swaying asf.

Therefore, it is highly preferred to provide a prolonged active support phase to not only determine the phase of a current movement, but to also respond to sensor signals indicative of an actual determination of the current movement and/or orientation or acceleration of the entire body or one or more body parts and to further adapt the control to regulate and/or activate the actuators in response to such sensor signals.

Also, it is possible to time the unreeling of a tendon of an active component using the control so that even without performing work, a support or assistance by the active actuators may be longer or shorter. Rather than allowing unreeling, the actuator can also be controlled to maintain the length of a tendon as is for a certain time. It should be noted that the length of the tendon can be estimated if an encoder is provided for measuring the rotational angle of the shaft of an electrical motor.

It should also be noted that it is advantageous to adapt the response of the control to the speed of the cycle. For example, a user walking faster will not only need shorter phases of active support and support phases more frequent in time, but also a different run of the support curve (that is, e.g. the power applied to an electrical motor will be different even if scaled appropriately). Also, the response of the control to sensor signals can be varied with the speed of the cycle because e.g. when walking at a higher or slower speed than usual, it may be necessary to alter the range of joint angles allowed, to change the conditions for determination of foot touch down or lifting of a foot asf. It is thus preferred if the control is adapted to determine the speed of a cyclical activity a user executes and to adapt at least one of the parameter ranges of joint angles allowed during activation of actuators, or the conditions for determination of a foot touch down event or of a foot lifting event, or the strength of activation of an actuator during a given phase of the cycle. In this way, support for an impaired person is significantly improved.

Accordingly, a delay may be considered short if it will not be longer than about 10% of the cycle time of a cyclic activity such as the time of a stride in walking, preferably less than about 5% of this cycle time and in particular less than 3, 2 and 1% respectively. It is preferable if the active support phase is not shortened by more than 25% of a possible active support time due to a delay, preferably less than 20% of the active support time, in particular less than 10%, 5% or 2% of the support time. It will be noted that a more severe shortening of the active support time may be acceptable for patients who although needing assistance are generally needing but little support. Also, it is noted that the work performable by a soft wearable muscle assisting device during an active support phase may vary over time and that an overall significant support in terms of work effected may be obtained even if the actual time of support is shortened by not supporting the initial 10% of possible active support time.

A delay may be considered sufficiently short if either condition—acceptable shortening of active support time or delay related to the length of the activity cycle—is met or if both conditions are met simultaneously.

When filtering signals, higher order filters can be preferred, such as 3rd or 4th order filters. Typically, the filters will be low pass filters as the cyclical activity is rather slow. A cutoff frequency can be below 30 Hz, and it is preferred to have an even lower cutoff, such as 20 Hz or even 10 Hz. However, using a cutoff frequency too low will suppress signals indicative of intended or needed deviations from a typical model behavior. Thus, it is preferred to have a low cutoff frequency higher than 5 Hz, preferably at least 10 Hz. It should be noted that all or only some of the sensor signals may be subject to filtering and that different filter might be used with different sensors.

Then, it should be noted that the control might be adapted to respond to different sensors or sensor signals during different phases of a cyclical activity. For example, where a user is provided with an assistance in walking, the control can initiate a next cycle in response to a detection of a zero crossing of an angular velocity of the thigh and can then determine the strength of actuation of the actuators during the cycle in response to the angular velocity of the shin. In this manner, a fast reaction to the beginning of a new stride and a precisely timed assistance with less variations over a plurality of strides can be obtained improving the user experience.

Also, the control may begin assistance to a next stride only once a stance phase has securely been identified in response to sensor signals obtained from both legs or leg parts of a user.

The control can be adapted to implement filtering digitally after A/D conversion or by using analog circuits.

As certain sensor signals are prone to noise or variation due to the effects mentioned, it might be preferable if the control responds to different sensor signals dependent on the current value of certain parameters detected. For example, an angular velocity of the thigh can be disregarded as being subject to a level of noise too high if the angular velocity is lower than 70°/s, preferably lower than 60°/s, in particular lower than 50°/s. If the angular velocity for the thigh becomes lower than this threshold, the angle may be considered instead. Also, when considering a zero crossing of an absolute angle, it may be useful to define a value other than zero that must be exceeded at least once before the zero crossing is considered to have certainly occurred.

Accordingly, what has been disclosed above can also be considered in one aspect to be an apparatus for supporting a limb of a user against gravity, comprising at least two garment elements and at least one passive force element attached between two adjacent of said garment elements as well as such an apparatus having at least one active element.

It should be noted that one aspect of the present invention can, without limiting the invention to such aspect, be seen as being based on the insight that a device for a solution aimed at improving the quality of life of patients with muscle weakness can be based on passive elements and can further combine the strengths of exoskeletons and exosuits as additional layer of elements. A device according to this aspect is usable for any limb, for both legs and arms, when performing activities of daily life using a wearable, lightweight, and low-cost solution.

In this aspect, an apparatus for supporting a limb of a user against gravity comprises at least two garment elements and at least one passive force element attached between two adjacent of said garment elements. Preferably the passive force elements are stretching bands or springs in this aspect The garment elements can comprise constringent elements maintaining the associated garment element in position wherein the constringent elements are essentially oriented perpendicular to the longitudinal axis of the associated limb portion. Such constringent elements can be cables provided and attached in the way of a corset, especially on an inner garment layer. The garment elements then can comprise stiffness inducing plates and/or glide plates provided between the user's skin and the constringent elements of the garment element which may be oriented vertically to the longitudinal direction of the associated limb portion.

The apparatus of this aspect or embodiment can further comprise at least one active support having a tendon attached at one garment element and actuated by a tensile force actuator, wherein the tendon is guided at least to one adjacent garment element, wherein in this aspect for every one tensile force actuator a passive force element is present being an antagonistic passive force element to the associated tendon portion.

Such an apparatus can in this aspect or embodiment have tendons being guided in low friction sheaths, wherein these sheaths are preferably at least partially attached to the corresponding garment portions. Each tendon in this aspect is usually guided on one side of the body of the user in view of its sagittal plane for a first garment layer and is then separated in two portions where these two tendon portions are guided on opposite sides of the coronal plane of the associated limb to be reunited into one single tendon on the opposite side of said sagittal plane to be guided on the adjacent garment layer. This is due to the fact that while walking or changing the stance from sitting to standing, the main axis of the hip raises the thigh whereas the shank is lowered in relation to the thigh, so that to help a person to raise to the vertical, the tendon may be guided in front of the knee but behind the back of the hip, while stronger stretching bands over the knee are behind the knee and stronger stretching bands for the thigh are in front of the person, whether stretching bands preferably being provided in front of the knee and behind the hip. Since it is advantageous to avoid shear forces, it can be preferred if the tendon is gliding in a direction of the main direction of the longitudinal axis of the corresponding limb portion; preferably, the garment elements comprise glide plates provided between the user's skin and the tendons. In order to further reduce shear forces, the tendons or tendon portions can be guided in criss-cross or zig-zag patterns on said glide plates.

Preferably according to this aspect or embodiment each tensile force actuator is either attached at one adjacent or opposite garment layer element or a guide direction change element is attached at said adjacent or opposite garment layer element guiding the associated tendon, so that the tensile force actuator can then be fixed at any place at the apparatus.

According to an aspect of the invention, the apparatus can comprise a control unit and at least one sensor attached to one of the garment elements, wherein the at least one sensor is configured or adapted to detect the angle of the limb portion associated with said garment element in view of the vertical and/or the sensor is configured or adapted to detect and/or measure and/or characterize a movement of the limb or portion thereof associated with said garment element and/or a change of angle or of angle velocity or a value of angle or angle velocity, wherein the control unit is adapted to control at least one tensile force actuator to support the movement and/or the angle change of the limb portion. The control unit stores, preferably for a plurality of joints, preferably for every joint, an authorized predetermined angle interval and/or allowed upper and/or lower value(s) as well as preferably stores for a group of joints predetermined angle intervals, these intervals in a preferred embodiment varying with e.g. gait or movement phase or speed of movement, the control being adapted to compare the sensor information for all or certain joints with said stored intervals or limits and to block the tensile force actuator(s) if an angle value leaves one of the predetermined thresholds or intervals to e.g. avoid a fall of the user equipped with the apparatus.

It is an advantage if the system according to one or more embodiments or aspects uses a multilayer, preferably a three-layer, architecture adapted to dynamically adapt its stiffness and/or level of support according, to the users' needs. Each layer may comprise features inventive on their own and may be used in a stand-alone solution or a solution of two of the three layers as will be described throughout the specification.

One advantage of a garment according to the preferred aspects relies inter alia on the minimization of the shear forces, as these can cause pain and discomfort, and maximization of the normal forces that provide the assistance e.g. against gravity. Furthermore, the design allows for the assistive forces to be more than small bursts of forces—applied during specific phases of the gait cycle in exosuits—and instead be applied throughout the users' movements for both either legs or arms or at least throughout prolonged parts of a movement period or cycle.

A three-layer apparatus may merge advantages of both exosuit and exoskeleton technology to provide the continuous assistance of exoskeletons with the flexible interface of exosuits. Unlike conventional exosuits, however, the apparatus according to preferred aspects minimizes the shear forces that can cause discomfort and maximizes the normal forces that provide assistance. By controlling the level of continuous assistance, the apparatus can assist its users better and more easily when moving against gravity (e.g. getting up from a chair or raising their arm to brush their hair), and when moving with gravity (e.g. sitting on a chair or lowering an object from a shelf) without collapsing.

The multi-articulated layer architecture according to an aspect of the invention actively assists against gravitational forces and provides stability to its user with a minimal number of actuators.

The apparatus of a preferred aspect implements a three-layer architecture: a base layer, a ligament layer, and a power layer, to be used independently or in combination.

The base layer interfaces in the preferred aspect with the user's skin and provides a comfortable garment-like feel that is designed to provide the user with all-day comfort; this layer may use breathable materials that maximize temperature and humidity control.

The ligament layer of the preferred aspect resembles the ligaments in the body and provides varying levels of support and passive resistance depending on the user's needs for mobility.

Finally, the power layer of the preferred aspect borrows from the body's muscle-tendon design and uses a series of sinew-like tendons routed across the user's joints and actuated by preferably force-controlled motors.

When combined in one system, the three layers of the preferred aspect work similar to an antagonistic pair of muscles to modulate the stiffness around the biological joints, and thus, provide structural stability in the absence of a rigid frame. By artificially increasing the stiffness around the human joints, the apparatus is able to mimic muscle co-contraction, which in turn provides stability.

The base layer of the preferred aspect is the direct interface to the clothed or unclothed human body and builds the basis for the ligament and power layer. Since shear forces can easily cause pain and discomfort, this layer is designed to minimize shear forces and/or transform shear forces to normal forces. This can be achieved by integrating functional textiles and/or semi-rigid anisotropic plates that transform the shear forces from the suit's power layer to normal forces acting on the user's body. The base layer incorporates in the preferred aspect multiple tendons or constringent elements, perpendicular to the power layer's tendons, arranged to automatically tighten when high force levels are required during assistance. It also includes a series of inlets, based on a layer jamming approach, to adaptively change the stiffness and account for any changes in muscle volume that occur during movement while avoiding extensive tissue compression. In other word, a body interface adapted to tighten when active assistance is provided. The tightening can be caused by muscle activity, the activity of the actuators and/or other coactive components without need for additional actuation of a tightening means. However, it is also possible to induce a tightening by causing a plurality of layers (or plies) of the base layer's body interface to jam. This jamming can be actively caused by appropriate inputs into the inlet where jamming layer having such inlets are provided. The appropriate inputs could be pressurized fluid, electrostatic charges and so forth. This unique approach increases the system's performance, the user's comfort, and overall safety.

In the upper body, the architecture of the base layer may also be used for bracing weakened ligaments. For example, in the scapula, the base layer may increase the stiffness of the shoulder joint to improve the transmission of forces from the muscles to the bones should this be necessary. The increased stiffness helps support the ligaments and allows the muscles to apply forces with less effort.

Unlike conventional exosuits, the apparatus according to a preferred aspect is able to provide high force levels that are able to substitute the user's muscle weakness needs to a very large extent albeit typically only some additional assistance is provided. This is due inter alia to the specific structure of the base layer.

The ligament layer in a preferred aspect consists of elastic materials that are placed close to or at e.g. the hip, knee, and/or ankle joints for the legs, and/or shoulder, and/or elbow, and/or elbow joints for the arms. This enables the apparatus according to a preferred aspect to store energy during movements that can be released to compensate for the weight of the legs and/or arms.

Finally, the power layer assists the main anti-gravity muscles and opposes the ligament layer.

Although the base layer as well as the combination of base layer and ligament layer can provide a solution for improving the mobility of the user, the best results can be achieved using all three layers.

The antagonistic structure provided according to certain aspects of the invention adds the stability and helps with stabilizing the body and balancing the trunk. Furthermore, the power layer can store a portion of its energy in the ligament layer.

The energy can then be released when the user requires support or weight compensation of the legs (e.g. during swing phase) or the arms (e.g. when extending the elbow).

The tendons are routed through the base layer and/or along the base layer so that one end attaches to the source of power (that is, an actuator) and then cascades into multiple tendons being routed across the joints and eventually attached to the base layer.

In terms of control software, the apparatus having a power layer according to the invention may use a force-based programmed controller that coordinates the stiffness of the joints in order to achieve continuous support against gravity.

The controller may use an array, or a plurality of motion and force sensors, used in a manner that estimates the user's postures and/or movement intentions or current movement. Based on this information, the power layer controller of the apparatus may decide how to optimally support the user's movements e.g. by modulating the forces applied and stiffness of the joints. The sensor setup may include IMUs (Inertial-Measurement Units) at the shank and thigh segments of the leg to measure leg kinematics, on the upper arm and forearm to measure arm kinematics, and at the body's center of mass to measure trunk movements. Load cells may be placed at each tendon to measure the forces of the power layer. Encoders in the motors of the power layer may continuously measure the rotational position of the motor shaft of the actuators thus estimating the length of the tendons. The combination of the load cells and encoders and/or the encoders signals alone allow(s) fine control of the stiffness and/or the force levels in the system.

Besides keeping the user in a stable position, the controlled, preferably force-controlled system can provide specific force profiles that target the user's needs during activities of daily life. In other words, the actuation of one or a plurality of coordinatively used actuators can be controlled to support or assist selectively in one or several of a plurality of activities of daily life.

The apparatus according to a preferred aspect can accommodate to the needs for a plurality of users by easily allowing the define various versions of the device. There are basic distinctions so that the user may choose between e.g. leg-only, arm-only, or leg and arm versions of the apparatus. Furthermore, the user may choose between a non-actuated (base and ligament layers) and actuated (base, ligament, and power layers) version of the suit/apparatus. Left and/or right sides can be assisted as needed. Adaption to different sizes is simple. It will be understood that it is not absolutely necessary to have every device for every user tailormade, but that despite great variations in user's needs, only a small number of basic design and/or size variants is needed.

In one aspect, the body interface or "base layer" forms the interface between the ligament and power layers, and the human body. The non-actuated and actuated layers can be used together or separately. The level of assistance of different versions of the suit can e.g. be adjusted by regulating or controlling or adjusting the stiffness of elastic elements in the ligament layer, as well as the distances of the tendons to the biological joints of the power layer.

From a rehabilitation point of view, it might be beneficial for some users to only use a non-actuated version of the suit. This is the lightest version of the apparatus according to the invention since the power layer alone accounts for approximately 70% of the weight within current embodiments. An example of a leg-only version of the apparatus has been found to weigh only 5 kg; this is well below half of the weight of the lightest exoskeleton in the market in 2016. Excellent assistance with respect to balancing the trunk, upright stability, and movements against gravity can be achieved with a powered version of the apparatus according to one aspect of the invention.

The apparatus according to the invention is preferably always provided with a plurality of sensors that can be integrated in or onto the layers. This sensor setup allows to control the active layer portions of the apparatus according to a preferred aspect, and may also be used to monitor the user. That is, sensitivities thereof and/or responses to sensor signals can in a preferred aspect be easily setup with any computer, tablet or mobile phone. This could be also used for quick assessments of the user during training or while using the device or suit in the daily life. The number of sensors in a non-actuated version of the apparatus according to a preferred embodiment can be reduced without significantly affecting the assistance provided by the suit. It should be noted that while no active assistance relying on actuations exerting forces on a body part by pulling at tendons may be provided in certain suits, it might still be possible and helpful to provide for e.g. a controlled tightening of garment plies so as to improve e.g. body stability.

DETAILED DESCRIPTION OF THE EMBODIMENTS

Figure 14:
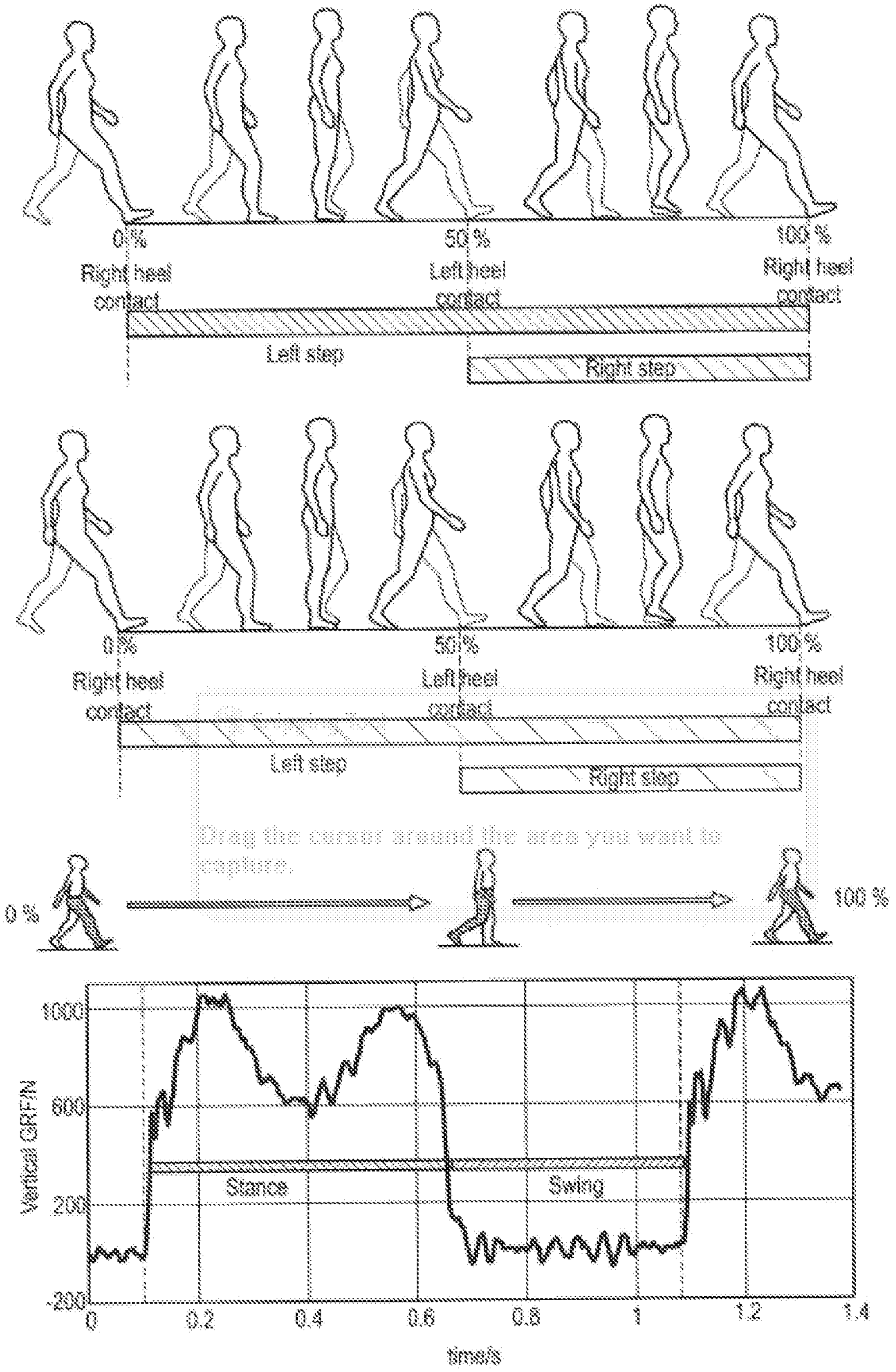
FIG. 14 is a multi leval chart illustrating a gait cycle of a person walking including identification of stance and swing phases.

The present invention relates to a soft wearable muscle assisting device that in one embodiment is used in walking. In order to understand how the soft wearable muscle assisting device can assist a user in walking, FIG. 14 is helpful. In FIG. 14, a person is shown in side view during different phases of a gait cycle. What can be seen is that during certain phases of the walking cycle, both the knee and the hip are extended simultaneously. In particular, both the hip and the knee become fully extended while lifting the foot of the opposite leg. Fully extending the hip and the knee raises the trunk, and, together with the trunk, the head and the shoulders are also raised. The muscles of the leg that is extended by simultaneously extending the knee and the hip must thus perform the physical work of lifting the body against gravity during this phase of the gait cycle. Where the muscles are not able to perform work during extension of the knee and the hip they must be assisted. As the hip and the knee are simultaneously extended during a phase (stance phase) where a rather high work is to be performed, it is helpful to assist the muscles of a weak user during this phase and this can be done using one actuator if the force from the actuator is simultaneously applied to both the hip and the knee.

Then, after the leg is fully extended, the opposite leg swings forward (swing phase) and the body is moved in front of the thigh of the leg still placed on the ground. In contrast, the opposite leg at the same time has a thigh that is in front of the body. Accordingly, the angle one of the thighs has can be defined to be a positive (e.g. forward) angle while the other is a backward angle. Considered in this manner, a zero crossing of the angle will occur when standing on the leg. It can also be seen that several angles could be defined, e.g. the trunk/thigh angle, the thigh/shank angle, the angle from hip to ankle asf. and it will be appreciated that these also vary in a cyclic manner during a plurality of strides. Having explained this for a better understanding of the device, the following is noted with respect to specific, nonlimiting embodiments of the invention. In the lower part of FIG. 14, the ground reactive force over the gait cycle is shown as an example of sensor signals that could be used in identifying the phase of a cycle.

Figure 15:
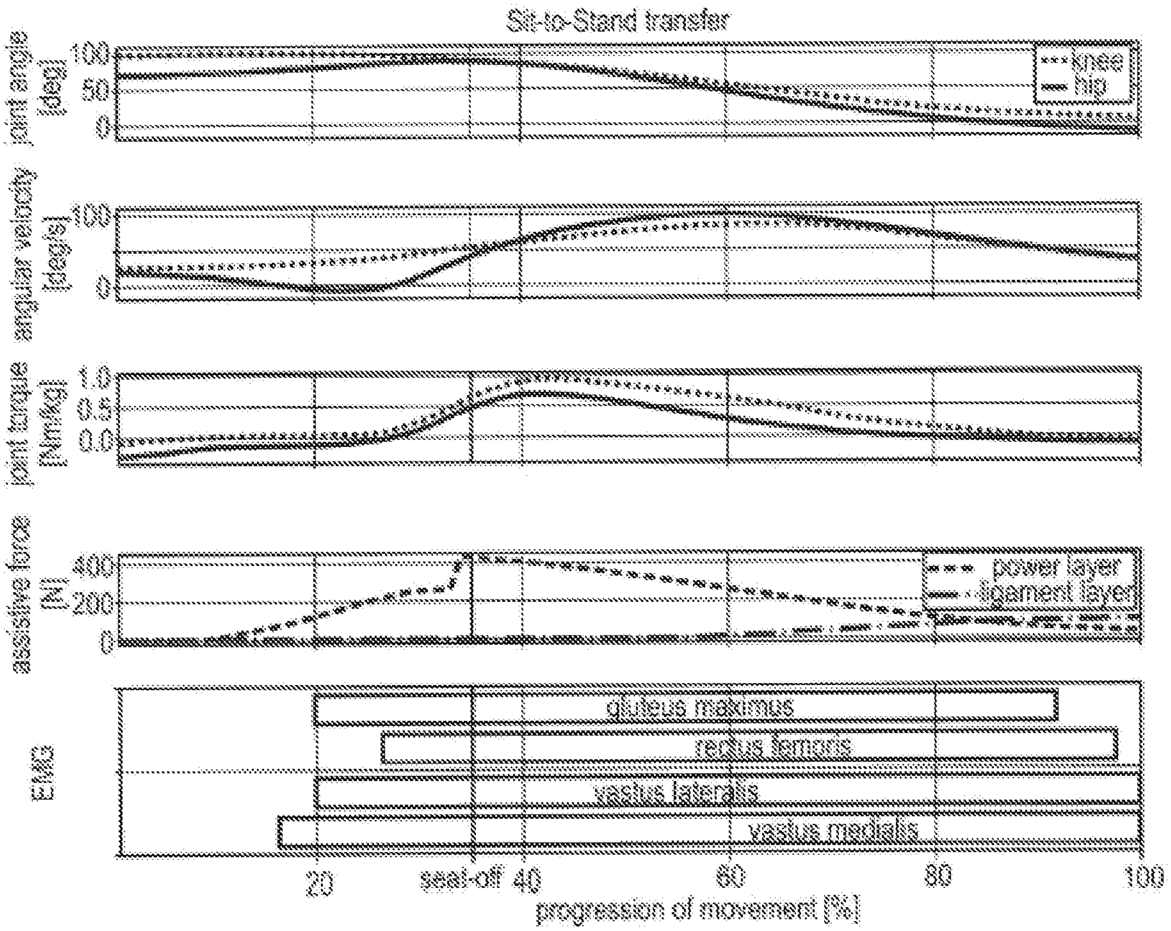
FIG. 15 is a set of graphs illustrating an exemplary embodiment of a cycle for going from sitting to standing.

In order to understand how the soft wearable muscle assisting device can assist a user in standing up from sitting, it is helpful to look at FIG. 15. As in FIG.14, FIG. 15 shows a typical cycle when going from sitting (0%) to standing (100%). In FIG. 15 the joint angles (hip and knee), velocities, and torques are shown for a typical movement. The figure also shows a potential profile of assistive force where the contribution of the passive and ac-tive elements of the soft wearable muscle assisting device are presented. This assistance pattern aims to support the muscles which are active during the movement as shown at the bottom of FIG. 15; these muscles comprise primaril', extensors of the hip and knee joints. It will be understood that in order to provide adequate support over large portion of the entire movement, it is necessary to identify that a user intends to stand up from sitting and to apply the correct force at the tendons by appropriate activation of the actuators.

Figure 1:
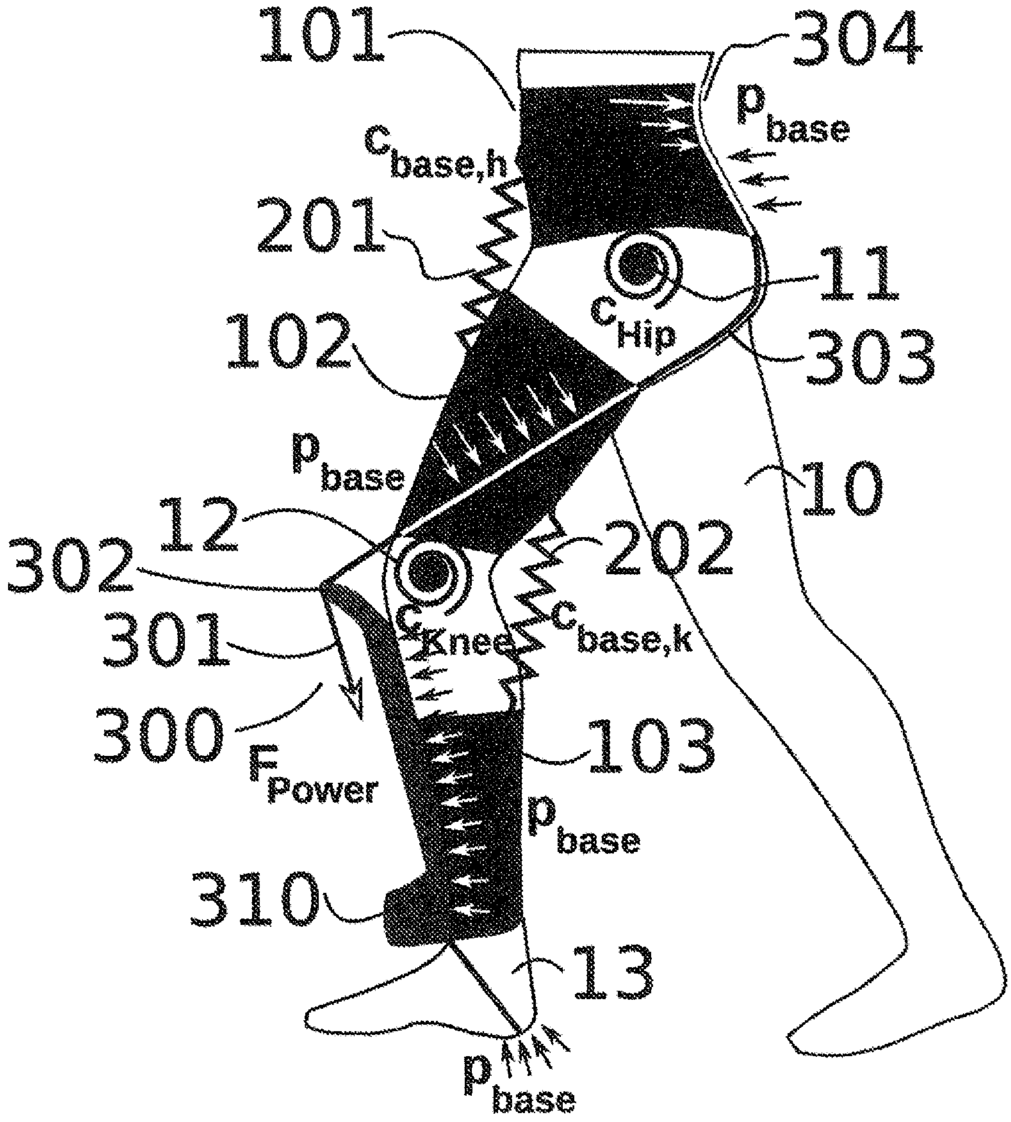
FIG. 1 is a fragmentary, schematic, side elevational view of legs of a user with an exemplary embodiment of a three-layer apparatus.

FIG. 1 shows a schematical view of the legs 10 of a user with a three-layer apparatus according to an embodiment of the invention, representing all occurring forces during operation of the lower limb schematically. The garment layer comprises a hip garment 101, a thigh garment 102 and a shank garment 103. The garments 101, 102 and 103, sometimes referred to together as garment layer 100, are corset-like clothes providing the contact with the skin of the user on one side and attachment points for the passive layer and power layer on the other side.

The passive layer comprises dampening elements, namely a hip-thigh passive "layer" 201 and thigh-shank passive "layer" 202. These passive layers 201 and 202, sometimes also referred to as passive layer 200, can be stretch bands attached at their free ends to the garment (layer) elements 101, 102, 103. They can be attached under prestress in such a way, that even for a sitting user, i.e. a user where the hip to thigh-angle and the thigh to shank-angle have are about 90 degrees, they are under tension, in other words, the bands have the greatest length and thus a restoring force for a standing user is provided. There can be one stretchband as passive layers 201, 202 for each leg, the upper stretchband being attached to the common hip garment layer 101 on each front side.

The power "layer" comprises a power layer unit 310 having a control unit, a power unit, sensors and at least one actuator for each limb. The actuator of this embodiment is connected with a power layer transmission tendon 301, attached at one free end at the power layer unit 310, guided around a direction change point 302 in front of the knee 12, guided around the bottom part of the hip garment layer 303 and finally attached with the opposite free end of the tendon in the upper portion of the hip garment layer 101 at a hip attachment point 304.

The power layer applies a force that equals F_Power. This force increases the stiffness of the hip 11 and knee 12 joint and causes the normal pressure phase: Combined with the passive elements 201 and 202 and their specific elastic stiffness, these forces are responsible for the joint stiffness modulation. The system can be easily set up to target specific deficiencies by adjusting phase accordingly as well as the moment arm at the knee.

It is possible to use the apparatus according to FIG. 1 for the lower limb together with a further apparatus for the upper body as will be described in the present specification. Both parts can share the same power and control unit. A unique array or arrangement of sensors as will be described is used to estimate all the joint relevant angles. Such a system will have four power layer units 310 comprising motors to compensate for the influence of gravity in both arms and legs, one for each limb.

As mentioned above, the three-layer architecture of the embodiment of FIG. 1 is composed of a base or garment layer, a ligament or passive layer, and a power layer. The configuration reliably provides stability and assistance with a minimum number of actuators and without a rigid frame. Both the ligament and the power layers are attached to the base layer which forms the interface to the human body. The power layer of this specific embodiment features distal tendon actuators in front of the shin and a main power supply and control unit provided here in front of the user's trunk. It should be noted that both the actuator and/or the control unit could be placed elsewhere in other embodiments, e.g. on a plate carried at the back of a user.

The tendons 301 of the power layer start at the tendon actuator, in one possible embodiment placed in front of the shin, and cascade multiple times within the base layer to provide optimal support. The power layer actively assists with hip and knee extension. The power layer includes rigid mechanical and electric components—such as motors, pulleys, PCBs and batteries—that are placed at body locations where they do not hinder any movements required during daily living. This arrangement allows the user to sit comfortably e.g. in a wheelchair. The tendon actuators provide high forces e.g. up to 500N. The ligament layer features passive elements that can store part of the energy provided by the user or by the power layer. This is achieved by an antagonistic arrangement of the power and ligament layer. The stronger thigh-shank stretchband 202 is provided behind the knee, whereas the tendon 301 is guided over a direction change point 301 in front of the knee. The hip-thigh stretchband 201 is arranged in front of the pelvis of the user, whereas the corresponding portion of the tendon 301 passes in a tendon hip guidance 303 behind the user. This design follows the insight that providing co-contracting muscles increases the joint stiffness to provide stability. The passive elements, i.e. 201 and 202 of the ligament layer are placed on the base layer, i.e. 101, 102, 103 to support hip and knee flexion as well as ankle dorsiflexion. The stiffness of the ligaments can directly be adjusted to fit the user's needs through either initial length change of the stretchbands or by exchanging the stretchbands.

The design of the ligament layer, in combination with the force modulation of the power layer, enables the system to provide individualized assistance while changing the joint stiffness actively. The forces generated by the power and ligament layer are transformed to normal forces by the base garment layer before reaching the user's body. The base layer itself incorporates elements that modulate the layer's stiffness to minimize shear forces and maximize the normal forces that provide the assistance. To ensure that the lower limb apparatus applies physiological relevant forces, an array or arrangement of sensors for motion and intention detection is embedded in the apparatus. For example, IMUs are provided at the shank and thigh segments of the leg to measure leg kinematics, and an accelerometer is provided at the hip garment layer to measure the upper body's movements.

The power layer unit 310 attached to the shank garment 103 comprises a tendon actuator producing forces by reeling in artificial tendons that cascade within the base layer. The system preferably uses a brushless motor in combination with a pulley system extending in front of the shin that is structurally configured to minimize bending forces. To achieve this, the tendon actuator mainly comprises lightweight polymers and composites. The dynamic actuators provide forces e.g. up to 500N. A load cell may be integrated close to the motor, to allow, in combination with all embedded sensors, for a reliable force control and stiffness modulation. A fan might be placed right above the motor and its controller to prevent overheating of the system. The system temperature is monitored continuously. Similar actuators can be used for an upper body apparatus but are, then, preferably a scaled down version of those used for the lower body since the required forces are smaller.

Figure 2:
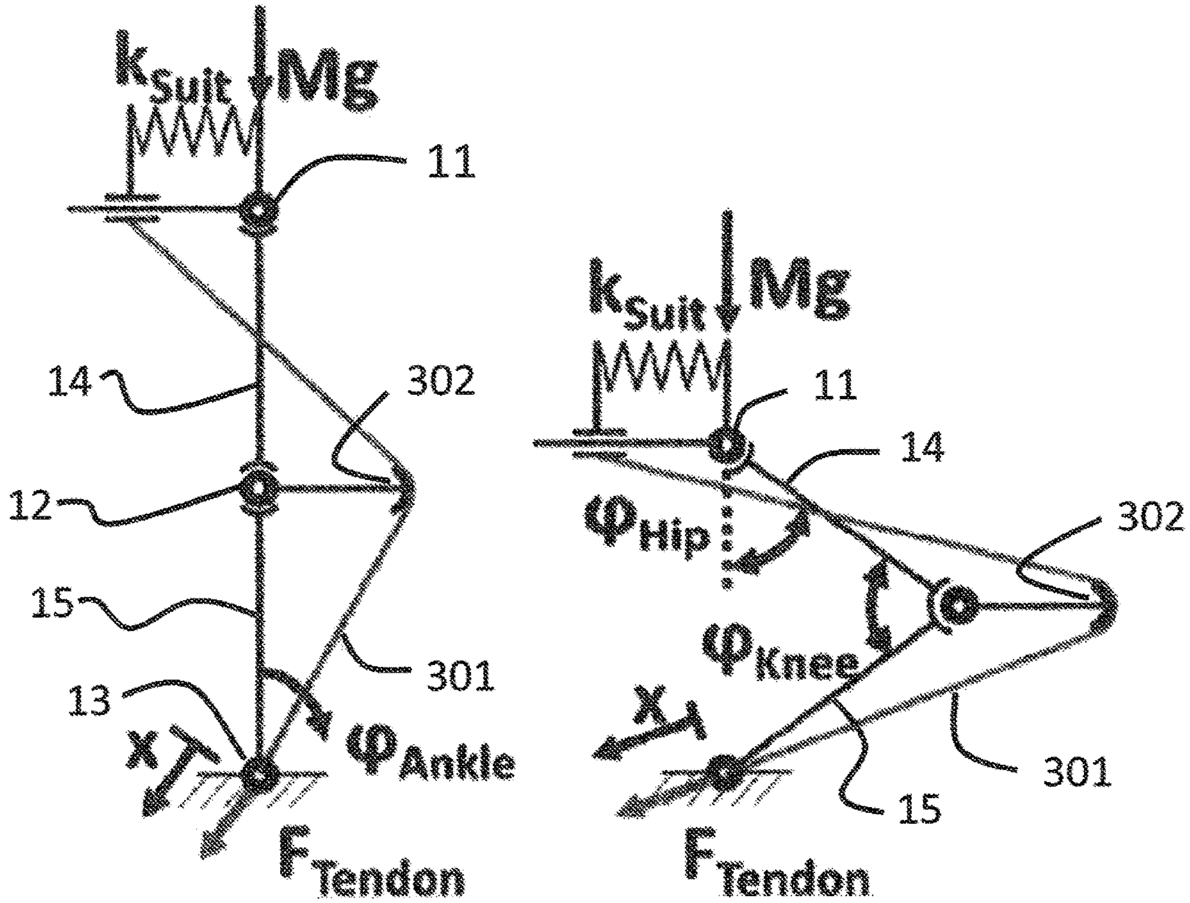
FIG. 2 is a set of schematic diagrams of the three-layer apparatus according to Fig, 1 in two different bending positions.

FIG. 2 shows two schematical diagrams of the three-layer apparatus according to FIG. 1 in two different bending positions. Similar reference numerals show similar features throughout all drawings. The forces provided by the lower limb apparatus can affect parts of the motor system beyond those involved in mobility. To maintain movement patterns that are physiologically correct, a link segment model is applied to the apparatus of FIG. 1 and is represented here as FIG. 2, from which it can be seen that there is a relation between the external moment arms—to generate joint moments—and the antagonistic springs that oppose the tendon of the power layer. In addition, and to ensure reliable transmission of forces to the user, the analysis includes an experimentally validated model of the combined stiffness of the user's soft tissue and the textile-based structure of the apparatus.

Figure 3A:
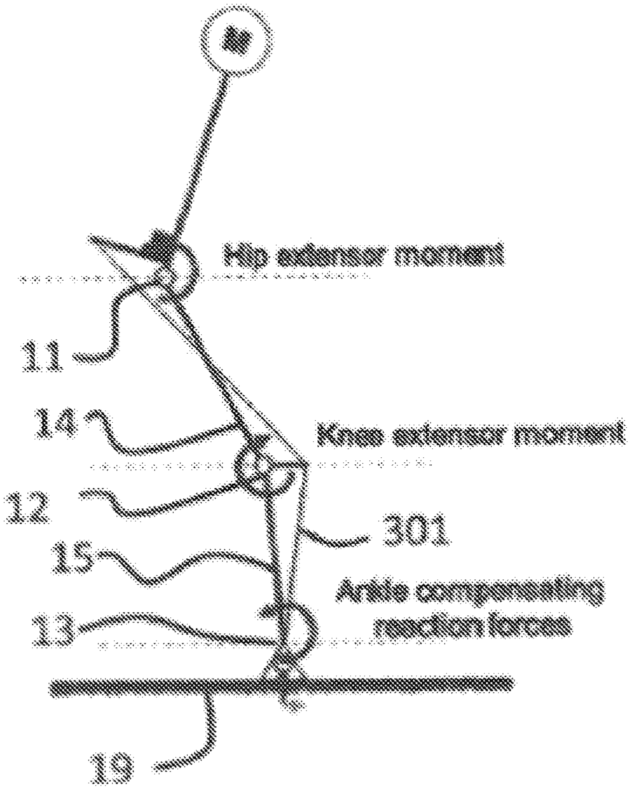
FIG. 3A is a diagram showing forces applied by a power layer of an exemplary embodiment of the apparatus of FIG. 1.
Figure 3B:
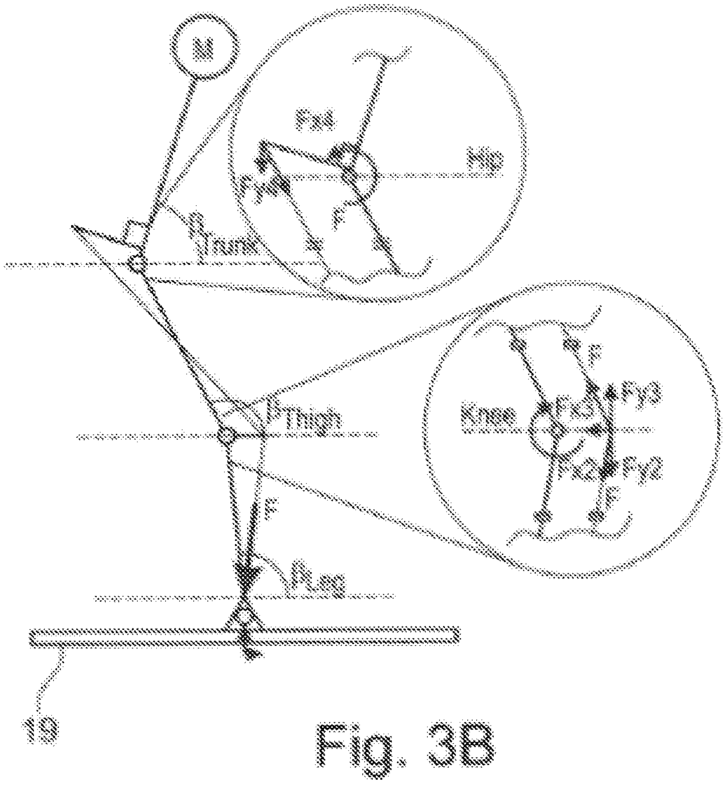
FIG. 3B is a diagram showing forces applied by a power layer of an exemplary embodiment of the apparatus of FIG. 1.
Figure 4:
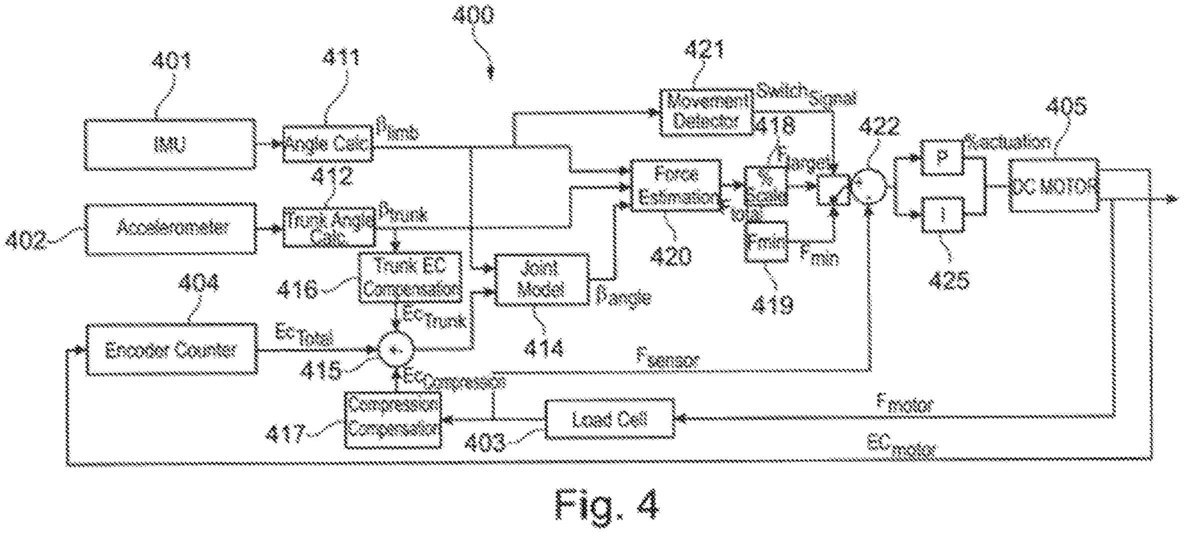
FIG. 4 is a block circuit diagram of an exemplary embodiment of a support assistance control unit used within the apparatus.

FIG. 3 shows two further diagrams showing the forces applied by the power layer of an embodiment of FIG. 1. The user is standing on ground 19 with slightly flexed leg. The support control unit (not shown) continuously estimates the user's posture and calculates the influence of gravity on the user's biological joints. Fy4 and Fx4 are applied to the hip restoring a greater angle Trunk. At the knee Fy3 opposes Fy2 in the vertical direction in view of the flat ground 19 whereas Fx2 and Fx3 are applied horizontally, redressing the angle Thigh as well as the angle Leg. To compensate for the force of gravity, the apparatus modulates the tendon forces and stiffness accordingly. The optimal force profile and system stiffness depends on each user. Parameters like the moment arms and the elastic spring constants, as well as the user's height and weight, can preferably be programmed into the system. By doing so, the system can address specific movement deficiencies. Because the apparatus always compensates for gravity, independent from the specific movement, the support assistance control unit 400 as shown in FIG. 4 operates independent of any user input. Additionally, the system can be used to generate forces additional to the gravity controller e.g. to dampen effects of spasticity. Sudden movements like a collapse can be detected reliably and prevented. The system aims and succeeds to keep the user in a statically stable position even while supporting dynamic movements such as walking or reaching for an object. The lower limb apparatus supports the extensor muscles Gluteus Maximus, Gluteus Medius, Rectus Femoris, Vastii muscles, Gastrocnemius and Soleus. To provide structural stability in the absence of a rigid frame the system mimics muscle co-contraction to increase the joint stiffness. This is achieved using the architecture where the passive layer opposes the motor layer. An increase in joint stiffness will prevent or reduce joint movement which in turn prevents joint collapse. The power layer can indirectly control the movements provided by the artificial ligaments. This is done by actively providing forces to dampen joint movement.

FIG. 4 shows a diagram of the support assistance control unit 400 used within an apparatus according to an embodiment of the invention.

The support assistance control unit 400 comprises four control sub-systems: joint angle estimation, stiffness modulation, gravity compensation and active force modulation. Most sensors are provided within the base layer. This relates to the IMUs 401 (at the shank and thigh) and instead of accelerometer 402, an IMU could be used (centrally at the upper front end of the hip garment 101). However, there are also sensors specifically used by the power layer. The load cells 403 and the tendon length estimation 404 are part of this layer. The tendon length estimator 404 is also referred to as encode counter (EC), since it obtains its signals from the DC motor 405 and its (rotary) position. The force-controlled system modulates the stiffness of the user's biological joints and applies additional forces to the three-layer architecture of the apparatus. The signals issued by the IMUs 401 are used for angle calculation of the lower limb in the angle calculation unit 411. The accelerometer or IMU 402 provides a signal used for angle calculation of the trunk in the angle calculation unit 412. The two angle calculation units 411 and 412 provide angle input signals for a force estimation unit 420 receiving further input relating to the B_angle, obtained from the joint model unit 414, working on the limb angle B_limb and a position information obtained from the adding unit 415 starting with the value of the cable I tendon length, estimated in unit 404 and modulated by a trunk EC compensation unit 416 as well as a correction value obtained from the compression and compensation unit 417 connected to the load cell 403. The angles as mentioned relate to the position of the trunk as well as the angle of the most distal segment (shin in the case of the lower limb embodiment, forearm in the case of an upper limb embodiment of the device)—there are filters and drift compensating calculations on top of that. Joint model unit 414 is responsible for getting the last remaining angle (beta angle) being the inter-segment angle (knee, elbow).

The force estimation unit 420 provides a control signal for the DC motor 405 to shorten or lengthen or maintaining the length and position of the tendon 301. This is modulated by the scaling support value 418, whereas a minimum force 419 is provided to counter the prestressed stretchband effect. The signals from the IMUs 401 also contribute via the limb angle calculation to the movement detector 421 which switches the signal between said F_min and F_target The IMUs 401 measure the angle of the most distal limb segment and can be seen as a filtered input. This value is an input for the link segment model according to an embodiment of the invention for the compression compensated angle estimation. Examples of models that can be simulated for leg assistance and arm assistance respectively are shown in e.g. FIGS. 2, 3, 7*a*, 7*b* and 18. It should be noted that in as far as the passive "layer" has two separate components that both extend between at least two garment components and that both comprise elastic material for storing energy and that are arrayed on opposite sides of a joint, the modules of resilience considered in a model could be adapted correspondingly so as to model the overall effect and/or additional elements could be considered in the model. F_min is the minimal force in the system to keep the tendons tensioned or in combination with the ligament layer it will set the correct stiffness around the joint. This control signal to drive the DC motor 405 is then modulated with a force signal from the value of the load cell 403. The motor applies forces equivalent to the influence of gravity (based on the underlying angle estimation+link segment model) or as far as F_min is concerned, it directly modulates joint stiffness in combination with the ligament layer. This signal combination happens in adding unit 422 wherein the output signal is used in a PI control scheme 425 to control motor 405.

It is noted that the above-mentioned calculations apply to both the upper body and the lower body suit.

The base layer acts as the interface to the user. This layer is partially made of stretchable and breathable materials. Additionally, it includes multiple elements that can change the apparatus stiffness as well as semi-rigid plates that are arranged to reduce shear forces and transform them into normal forces. The base layer also features tightening and self-tightening mechanisms using tendons that are arranged perpendicular to the tendons of the power layer. The power layer is attached to base layer. It comprises multiple tendons that are routed from the actuators in front of the shin over the knee and to hip joint. The power layer features pre-tension system to adjust the passive system stability. The ligament layer is also attached to the base layer and opposes the power layer's tendons.

Figure 5A:
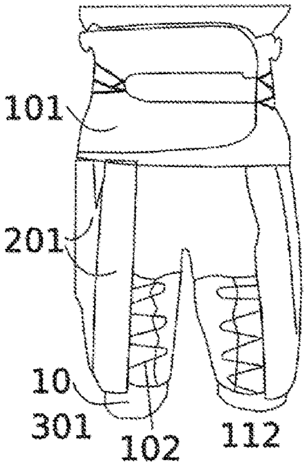
FIG. 5A is a front elevational view of an exemplary embodiment of elements of different layers of the apparatus.
Figure 5B:
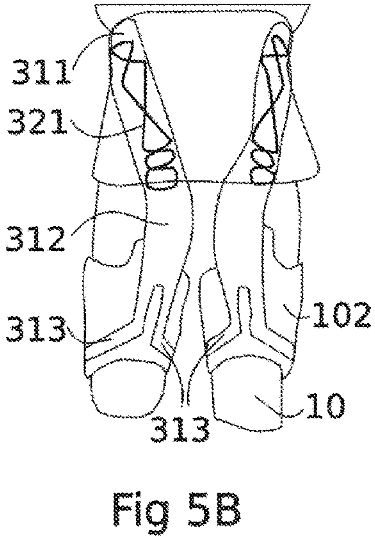
FIG. 5B is a front elevational view of an exemplary embodiment of elements of different layers of the apparatus.
Figure 5C:
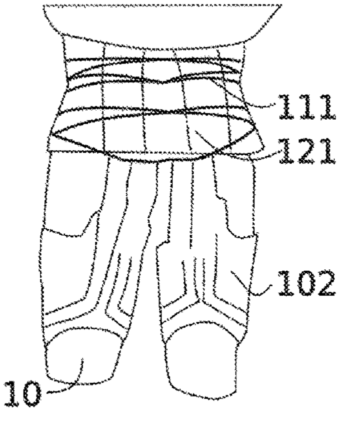
FIG. 5C is a front elevational view of an exemplary embodiment of elements of different layers of the apparatus.

FIGS. 5A, 5B and 5C show elements of the different layers of an apparatus of an embodiment of the invention. FIG. 5 A shows a front view of parts of the leg 10 and hip of a user having the garment layer 100 combined with elements of the passive layer 300.

The hip garment layer 101 comprises a flap covering the base mesh and which flap is attached via cables on the other side. A better view how these elements are attached to function as a self-tensioning hip belt can be seen in connection with FIGS. 12 and 13. FIG. 5C also shows the hip garment layer 101 but in a back view. The base textile is stretchable and resistant to wear, since a plurality of tensioning cables 111 are tightened over the surface of the base layer garment to distribute any pression coming from the cables 112 onto the entire surface, since the cables 112 are attached at the garment layer and are just shown covered by the 201. This self-tensioning system is oriented perpendicular to the motor layer's tendons 321 and thus avoids shear forces impending on the user's legs. Semi-rigid plates 121 within or on the garment layer are transforming shear forces to normal forces.

FIG. 5B shows a back view of the element provided on top of the base garment. This comprises on the back two paths 311, one for each leg 10. Each path 311 is attached at the upper end of the hip garment and comprises the hip power layer transmission tendon 321, provided in a criss-cross cord or zigzag arrangement, held by loops or tabs provided at the sides of the path 311. In other words, the transmission tendon 321 is guided along the path 311 from thigh to waist from one side of the path 311 to the other side 311 of the path by friction-low loops or tabs on the opposite edges of the path 311. There are more loops or tabs near the thigh and the upper end of the path and there are less (here essentially one long crossing pair of tendons over the middle of the path 311). This pre-tension mechanism increases stability. These tendons continue in two parallel tendons in area 312 as covered path, before splitting up into two cables guided in silicone tubes 313 to be guided on both sides of the lower thigh towards the knee, where the cables are attached together into one single tendon 301, being redirected through direction change point 302, usually being a glide surface in a predetermined distance in front of the knee 12 and then guided to the motor unit of the power layer in unit 310 in front of shank.

Said tension mechanism 311, having a plurality of tensioning cables, is oriented perpendicular to the base layer. It has an associated tension mechanism 312 within the thigh garment layer 102 and also, though not shown in FIG. 5A to 5C, in the shank garment layer 103. They contribute to the stiffness of the garment FIG. 5A also shows the two stretch-bands for each leg 10 as well as hip-thigh passive layer 201.

Layer jamming inlets are provided to adapt the stiffness of the suit. The interaction forces between the apparatus and its user were evaluated with regard to their influence on the musculoskeletal system so as to form a basis for a system to detect slippage and improper fit during operation.

Moreover, the system's efficiency can be improved by improving the transmission of forces from the apparatus to the user. This was done using a layer jamming approach to adaptively set the stiffness of the suit. This technology increases the efficiency of the apparatus and it also improves the level of comfort by reducing the forces acting on the user's body which is explained in connection with FIG. 13.

To ensure that the apparatus minimizes shear forces and primarily transmits normal forces to the human body, pressure sensors and 3-axis force sensors are preferably used to measure the impact of the features of the apparatus according to an embodiment of the invention. Tekscan pressure sensors were used in a practical example to create a pressure map at several locations on the trunk. Furthermore, optical force sensors (Optoforce OMD-20-SE-40N) were integrated to detect any shear forces applied to the user's skin. It was shown that the system architecture minimizes shear forces and transforms these to normal forces.

Figure 6:
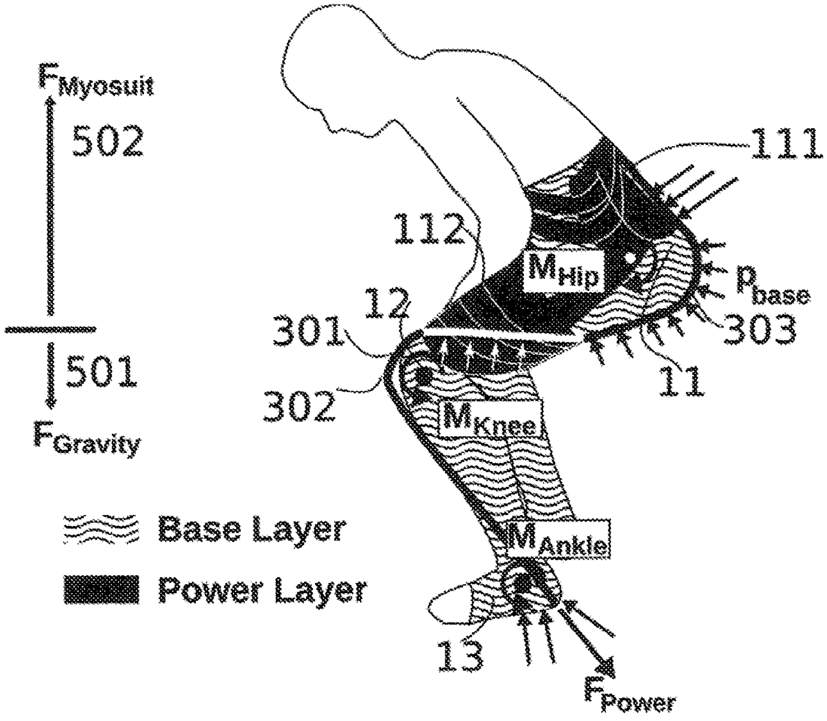
FIG. 6 is a diagrammatic side elevational view of a user in a bent over position with similar force and moment explanations as the apparatus in FIG. 1.
Figure 12:
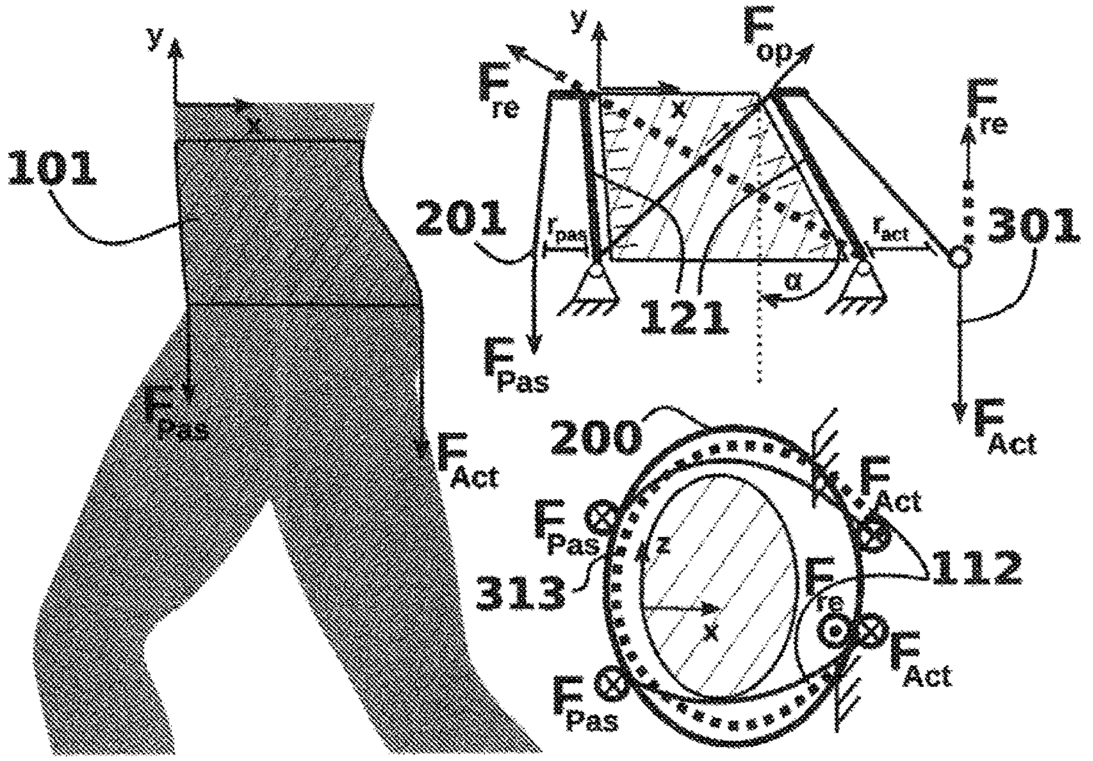
FIG. 12 is a fragmentary, side elevational view of principles of activation achieved through an exemplary embodiment of a garment layer.
Figure 16:
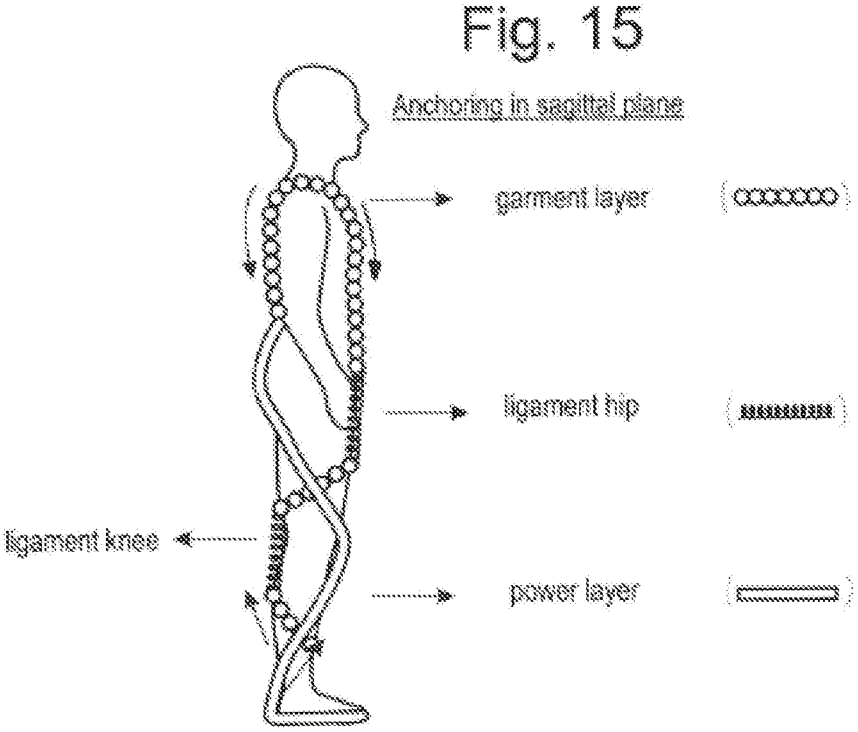
FIG. 16 is a sagittal elevational view of an anchoring of forces along the sagittal plane for an exemplary embodiemnt of a soft wearable muscle assisting device, the forces being distributed between the three layers: garment, ligament, and power layer and are distributed from the shoulder to the feet.
Figure 17:
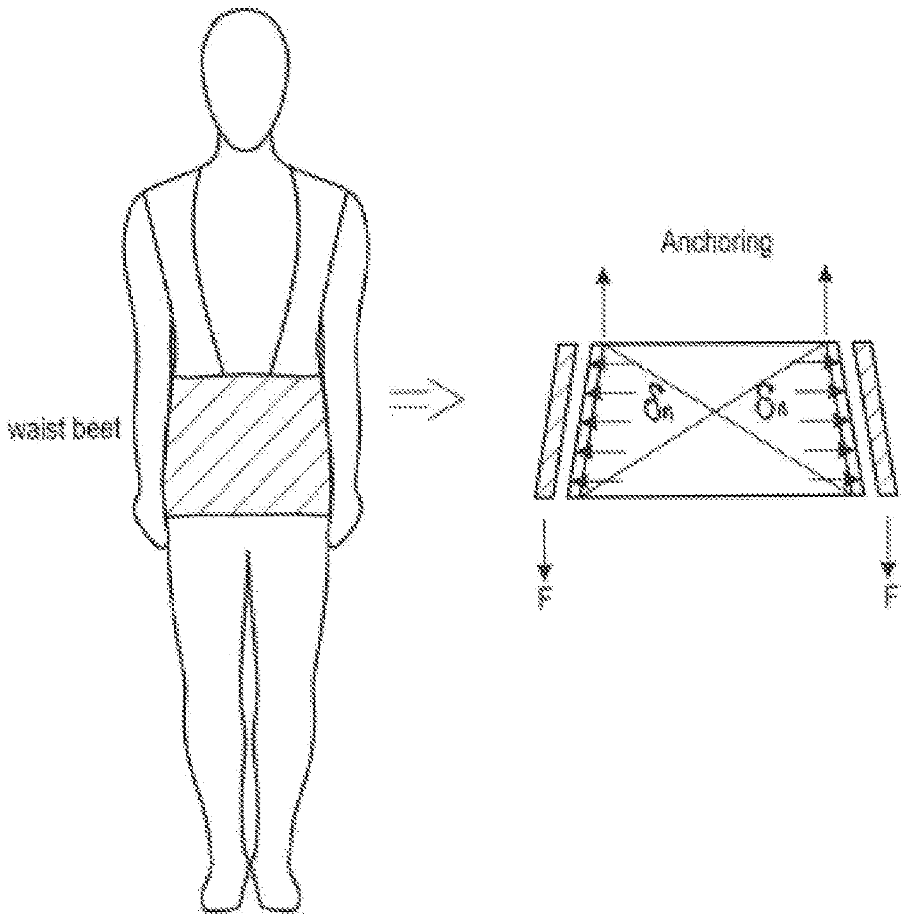
FIG. 17 is a front elevational view of a diagram illustrating a principle of a. force-distribution model to shift shear forces into normal forces, the two tangential forces (F) applied on the sides converted into primarily normal forces (sigma_n) on the user by the architecture of the cuff-like system.
Figure 18:
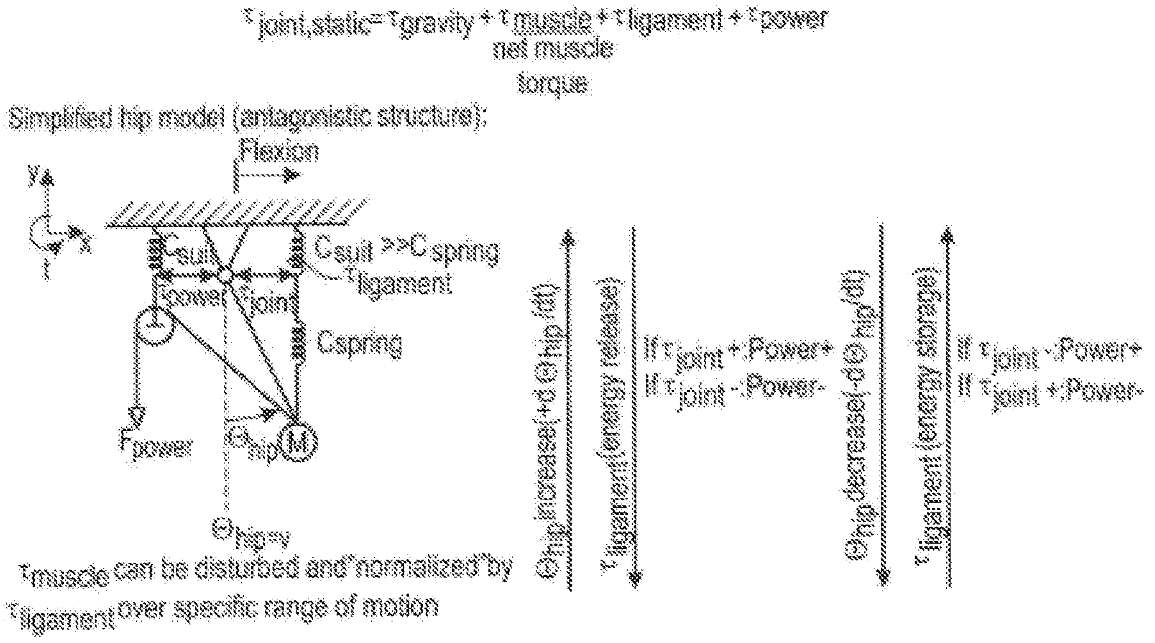
FIG. 18 is a diagram of a model of torque at a joint (T_joint) as the combination of external torques (T_gravity), torque of the user's muscles acting on the joint (T_muscle), and the contribution of the soft wearable muscle assisting device (T_ligament+T_power), the total power delivered to the joint regulated based on activity performed by the user to be either positive power (Power+) or negative power (Power−) depending on whether the angle of the joint increases or decreases; as shown in the schematic, when the angle of this given joint decreases, energy is stored in the ligaments (T_ligament), once the joint angle increases, the energy is released.

FIG. 6 shows a user in a bent over position with similar force and moment explanations as in FIG. 1. This schematic of the lower limb apparatus shows how the base and power layer interact. The power layer's tendons 301 modulate the stiffness of the biological joints 11, 12 and 13. These forces with a component in the vertical direction as apparatus force F_Myosuit 502 compensate the influence of the gravity force 501 on a joint level. To avoid the shear forces acting on the user, the base layer transforms these forces to normal forces. A possibility to transform shear forces into normal forces is shown in FIG. 17 indicating that appropriate design of the garment portion helps to avoid shear forces. Also, it is possible that semi-rigid, anisotropically arranged plates are integrated in the base layer as shown in FIG. 12. Semi-rigid refers to both the stiffness changing inlets and plates that are embedded in the suit. Semi-rigid is related to stiff and solid, yet flexible in certain directions. The anisotropic behavior refers to different stiffnesses in longitudinal and crosswise direction which is mainly needed to optimally adapt to the body shape. The principle is explained in connection with the description of FIG. 12 and FIG. 13. These plates 121 are arranged in a specific way, so that the base layer still has a garment-like feel. This arrangement is able to create a moment around the connection of the power and base layer. Reference is also made to FIG. 16 showing that distribution of forces can be improved by appropriate anchoring of elements.

The user will experience this moment as normal forces that help him to return to an upright body position. The schematic shows an application scenario of the lower limb apparatus. In this embodiment, the system allows for sitting in a wheelchair comfortably. The wheelchair can be used to travel long distances and the apparatus is only deployed when the user needs to negotiate obstacles or wants to be in an upright position. The wheelchair provides a high capacity battery which is able to charge to the battery of the apparatus inductively. The inductive charger is built in the backrest of the wheelchair. Once the user is sitting, the batteries of the apparatus are charging based on the wheelchair batteries. This allows the soft wearable muscle assisting device to be used with small capacity batteries. Therefore, the device can be very lightweight since the batteries are one of the main drivers in terms of weight.

Figure 7A:
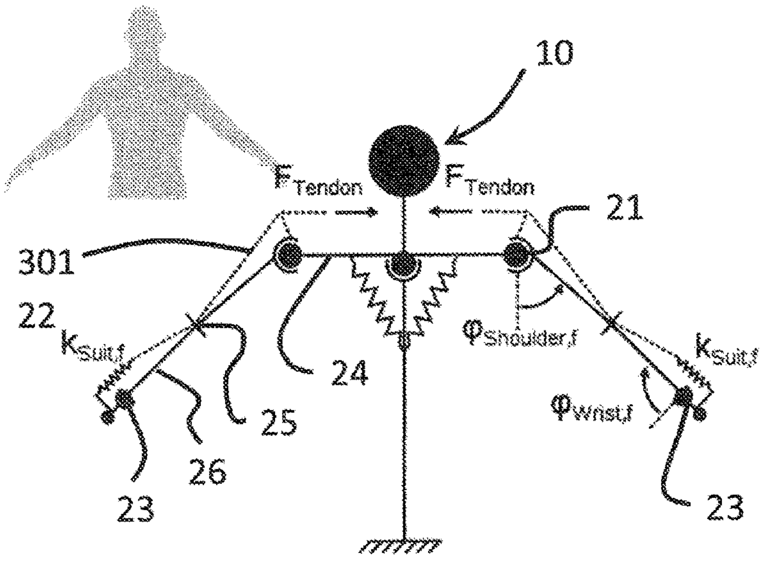
FIG. 7A is a fragmentary, schematic front elevational view of an exemplary embodiment of a three-layer apparatus for the arm.
Figure 7B:
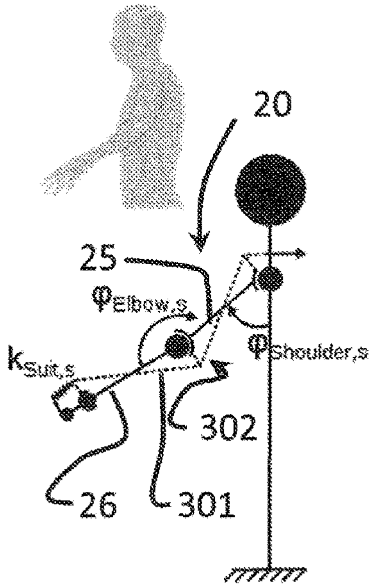
FIG. 7B is a fragmentary, schematic sagittal elevational view of an exemplary embodiment of a three-layer apparatus for the arm.
Figure 8:
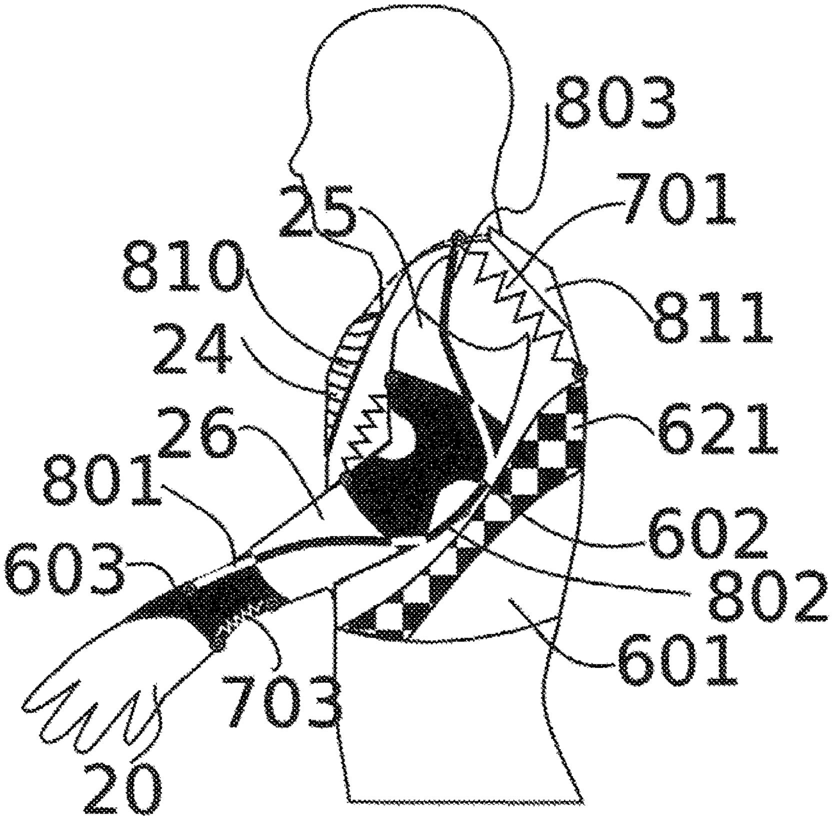
FIG. 8 is a fragmentary, diagrammatic, side elevational view of a torso of a user with an exemplary embodiment of a layer apparatus for support of an arm.

FIG. 7A and FIG. 7B shows two schematic diagrams of a three-layer apparatus according to a further embodiment for the arm 20 in a frontal plane view and in a sagittal plane view; FIG. 8 shows a schematic side view of the torso 24 of a user 10 with a three-layer apparatus according to the further embodiment of the invention for the support of an arm.

FIG. 7A and FIG. 7B show how the principle used in the lower limb apparatus as shown in FIG. 1 is transferred to the upper body. The upper body apparatus does provide support in both the sagittal and frontal plane. The elbow joint 22 and shoulder joint 21 are gravity compensated by the same antagonistic architecture as in the lower limb apparatus. Wrist 23 flexion and extension is also supported antagonistically. The power layer actively supports joint extension and the ligament layer assists joint flexion. Assistance to the shoulder joint 21 is focused on compensating the weight of the arm 20. The base layer builds the interface for the ligament and power layer and includes stiffness changing inlets 621 that are placed near the shoulder joint to support the ligaments. The inlet 621 starts at the shoulder 21 and runs at the side of the user to the lower edge of the torso harness 601. This allows the muscles to apply forces with less effort while additionally being supported by the power and ligament layer. Unlike the lower limb apparatus, the tendon actuators 810 of the power layer are placed close to the trunk, i.e. torso 24, to avoid distal masses. In another embodiment, not shown in the drawings, the lower limb actuators are placed above the hip joint. The design also features a clutch mechanism 811 that adjusts the cascading tendons across the shoulder 21 to move the arm 20 in both the frontal and sagittal plane as seen in FIG. 7A and FIG. 7B. The clutch selects between the front and sagittal plan according to the user's intent of movement which is detected automatically, mechanically or through detection via sensors and the control unit deciding to switch the element. The clutch will work through sensor input (IMUs+cable length), the switching will then depend on the user's intention based on an initial direction. The clutch engages one option or the other.

The torso harness 601 comprises a spring or stretchband 701 attached at the shoulder 21 near the redirection point (not visible) of the shoulder cable guide 803 towards the cable actuator 810 and furthermore attached at the backside of the torso 24. The shoulder cable guide 803 comprises the cable (not visible) and guides it from the front side towards the elbow pad 602 on the underside in a predetermined distance in the elbow cable guide 802. Then the cable continues inside the forearm cable guide 801 towards the dorsum of the hand and is attached at the wrist pad 603 on the back of the hand. Wrist pad 603 comprises at the underside a wrist spring 703 acting antagonistically to the cable guide 801.

Figure 9:
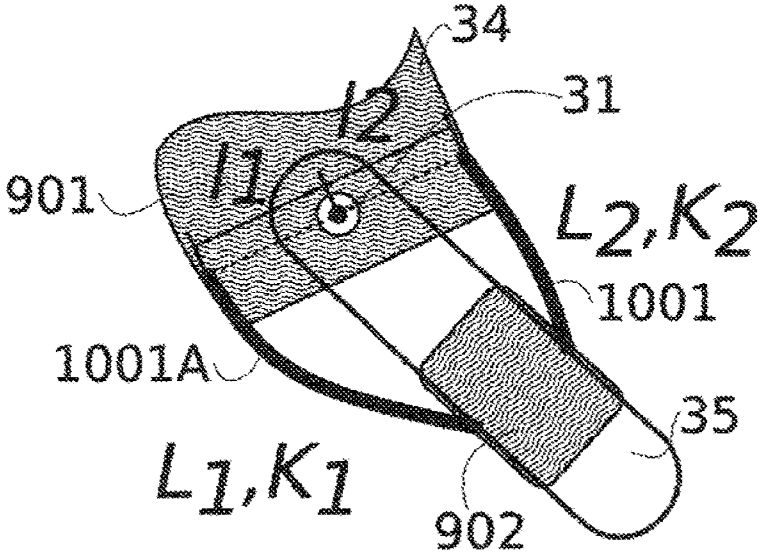
FIG. 9 is a fragmentary, diagram illustrating a general working principle acting on a single joint.

FIG. 9 shows how a general working principle acting on a single joint, here called upper joint 31, can be implemented independent of the application for a lower or upper limb. In this setup two layers—garment and passive are present. The garment layer is shown as 901 for the body garment and 902 of the upper limb part garment encompassing the upper limb portion 35 and it is connected, in this general setup, by two elements 1001 and 1001A of the passive layer. Two elements are shown in this embodiment, as opposed to one, to highlight that more than one passive element 1001 can join the garment layer parts 901 and 902. The two elements ultimately define the torque profile across the joint 31; that is, the length and stiffness of each passive member (Li and Ki), and the size of the moment arm across the joint (li), wherein i=1 and 2.

Figure 10:
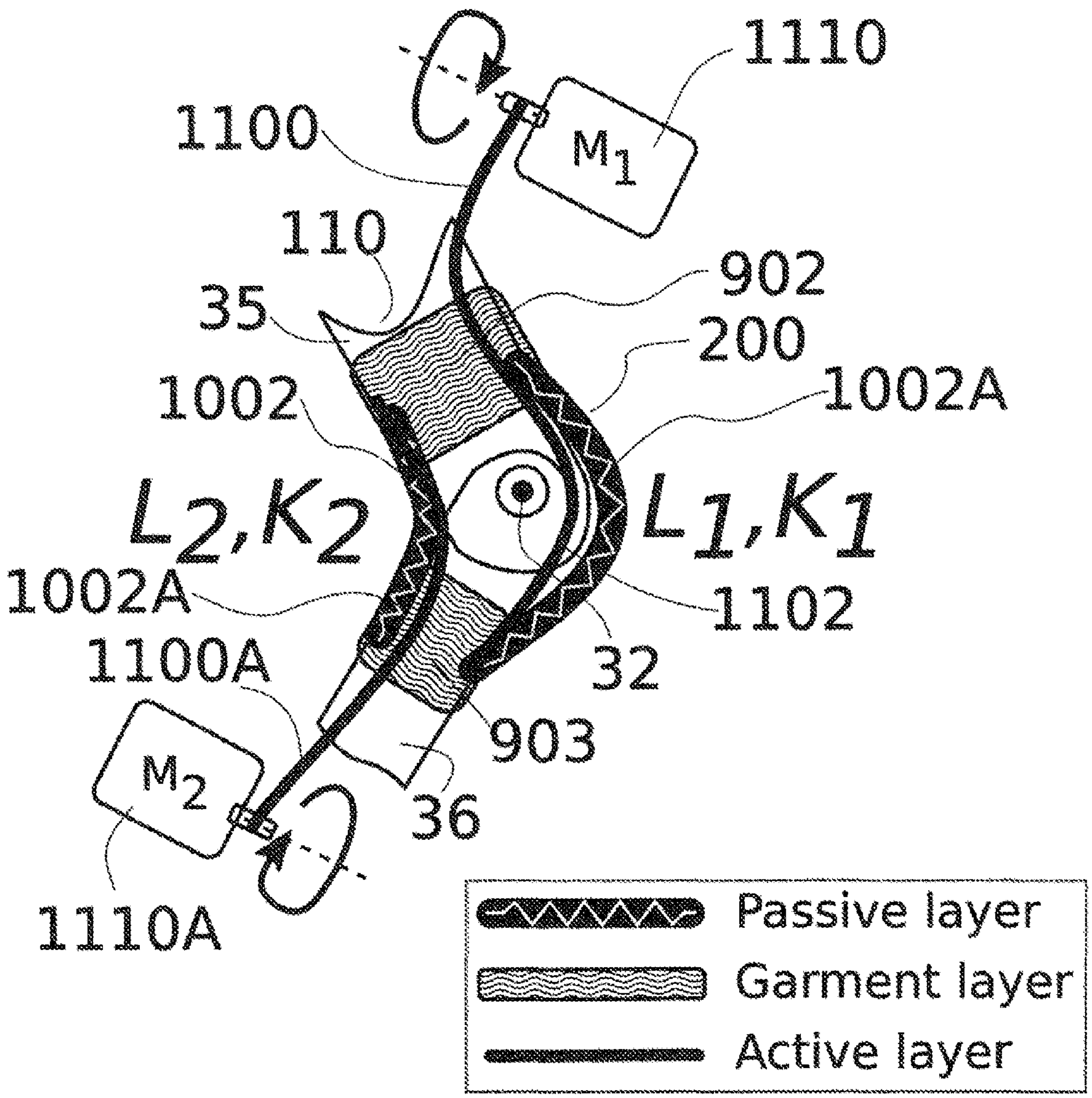
FIG. 10 is a fragmentary, side elevational view of a general scenario for an exemplary embodiment of a joint with passive and garment layers as well as having active components.

FIG. 10 shows a general scenario for a joint, here lower limb portion 32, where again the passive 200 and garment 100 layers working across a joint 32 are shown and here also the active components (motors or actuators 1110 and 1110A) are included, which can further regulate the stiffness of this joint 32. The motors 1110 and 1110A are placed in arbitrary locations to highlight the fact that they do not have to be placed at a specific location, if the tendons 1100 and 1100A are routed across the joint 32 and if they are connected to the garment layer 100 appropriately. The first tendon 1100 actuated from above is attached at the lowest possible garment 903. In the example, in the case of an upper limb, it can be a wrist pad and in case of a lower limb beyond the ankle it can be at a heel pad. The second tendon 1100A is actuated from below and is attached at the uppermost garment 902. Nevertheless, the associated motor 1110 or 1110A can be positioned elsewhere, as the tendons are "attached" at the garment in the sense that the tendons are e.g. contained in a (preferably slack) sheath fixedly attached to the garment element. Associated to each tendon 1100 and S1100A is an antagonistic passive element, i.e. 1002 and 1002A, respectively.

Figure 11A:
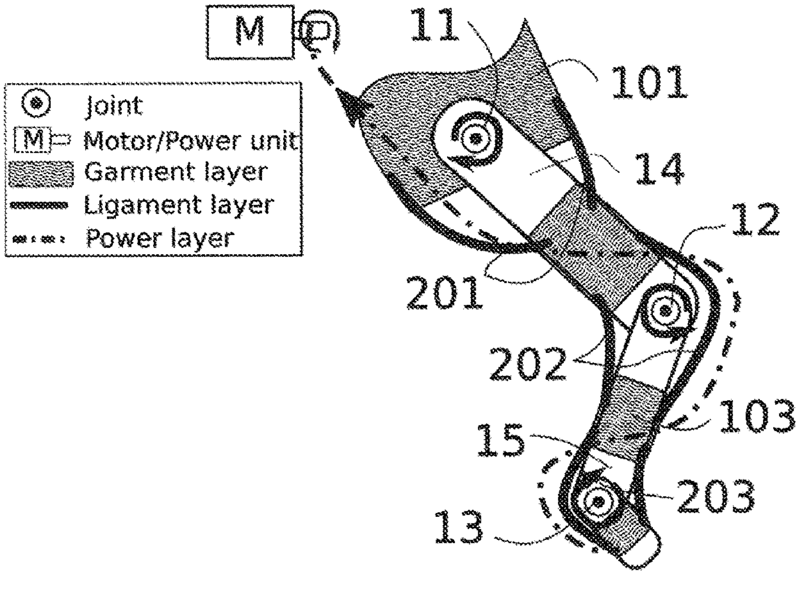
FIG. 11A is a fragmentary, side elevational view of a leg in a partially bent position while using an exemplary embodiment of an apparatus.
Figure 11B:
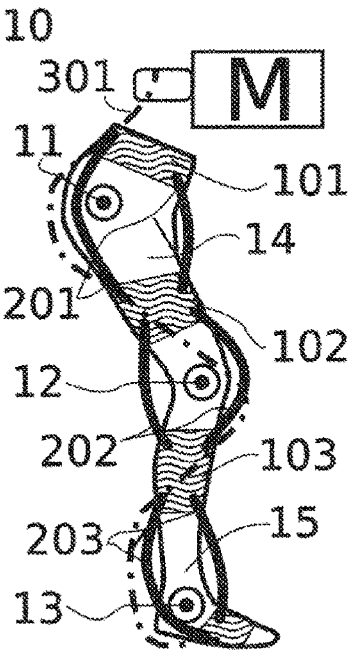
FIG. 11B is a fragmentary, side elevational view of the leg of FIG. 11A in a straighter position.
Figure 11C:
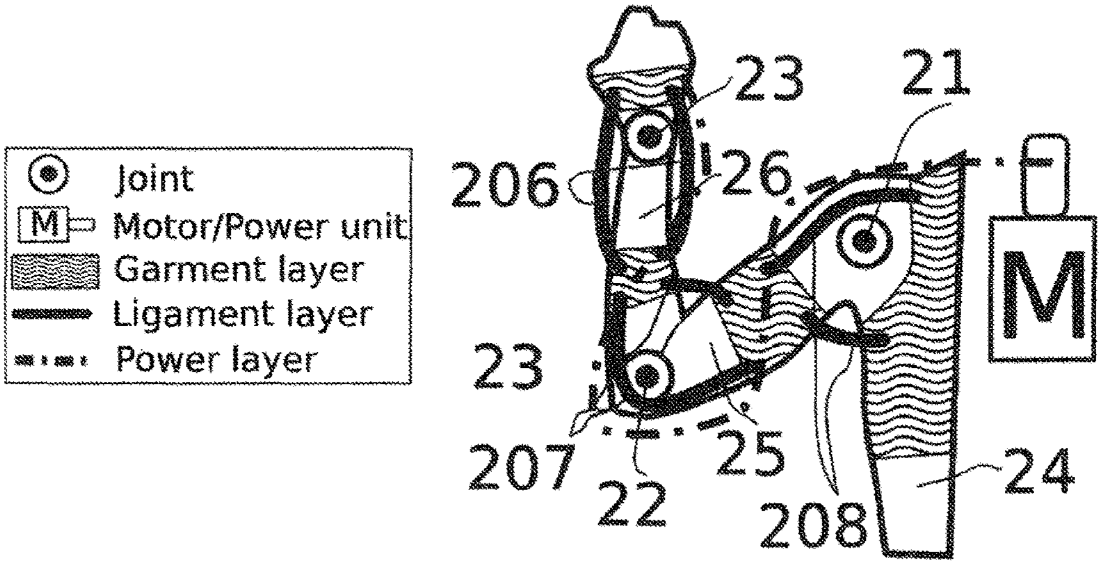
FIG. 11C is a fragmentary, side elevational view of an arm in a partially bent position while using an exemplary embodiment of an apparatus.

FIG. 11A shows a schematic view of a leg in a partially bent position while using an apparatus according to an embodiment of the invention. FIG. 11B shows a schematically way of the leg of FIG. 11A in a straighter position. FIG. 11C shows a schematic view of an arm in a partially bent position while using an apparatus according to an embodiment of the invention.

FIG. 12 is useful for understanding how activation is achieved using the garment layer. The apparatus according to an embodiment of the invention features self-tightening mechanisms integrated in the textiles. When the apparatus is actuated and applies forces actively (F_Act), then the system automatically tightens and increases normal forces. This refers to the criss-cross (or zig-zag) structure that automatically tightens when forces are applied. F_Act is coupled to the structure, so that the forces are also used to increase "tightness" of the "corset". The active tendons are directly connected to this corset-like structure which is wrapped around the body and limbs. This enables the system to apply continuous levels of tightness proportional to the applied forces to compensate gravity. This mechanism increases user comfort by reducing the forces applied to the user over time. The integral design of the base layer ensures that no slippage of the apparatus appears during low force scenarios.

The apparatus base layer compromises different structures that aim to minimize shear forces. Thin polymer sheets are stacked upon each other and create the effect of layer jamming. When compressed, they increase the stiffness by forming a rigid bond. The sheets have low adhesion (flexibility when not compressed) and high friction coefficients (rigidity when compressed). The required compression forces can be achieved through the apparatus structure itself (corset), pneumatically or through electro-adhesion. This allows the base layer to take on the body shape during actuation and it increases the contact area between the base layer and the human body. Increasing and optimizing the contact area results in low normal and shear stress (sigma/tau=F/A, referred to as alpha in the present drawing). The increased stiffness reduces the compression forces through a circular structure that distributes the forces within its structure when rigid. A high system stiffness also increases the apparatus efficiency since it decreases tissue deformation and minimizes cable travel.

Figure 13:
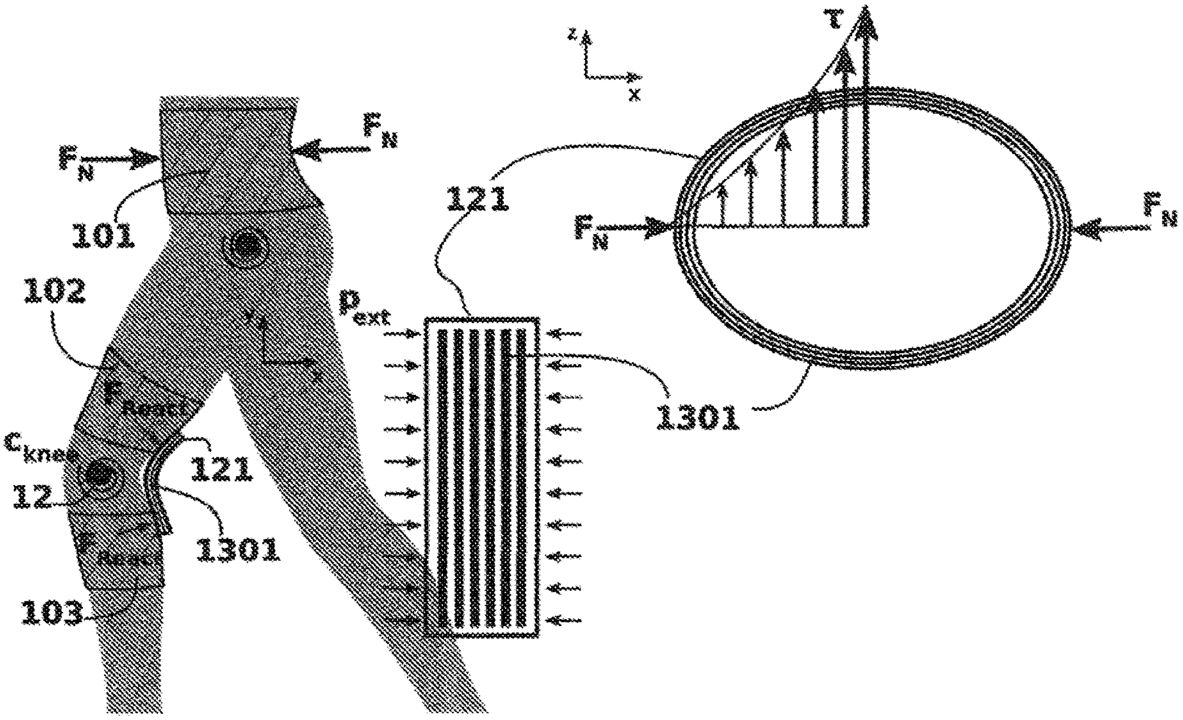
FIG. 13 is a fragmentary, side elevational view of an exemplary embodiment of a stack of layers to be used to increase joint stiffness to counteract gravity.

The antagonistic structure of the apparatus itself (Base+Ligament+Power Layer) decreases shear forces by re-routing forces along the body to counteract forces being applied on the opposite site of the body. The virtually fixed bearings shown in FIG. 12 are present because of the tight fit between the apparatus and the human body. During such force scenarios the stacked sheets in the base layer will become rigid. As an alternative, these parts could be replaced by other high stiffness polymers or composites—although this will reduce user comfort and the tight fit, and thus, decrease the system efficiency. The rigid spacer between the rigid plates and the textile layer on top creates a moment arm fact. This results in a moment around the virtually fixed bearing which in return introduces a force F_op. The generated force partially counteracts the shear forces on the opposite site (F_Pas). This concept works in a cross-arrangement on both sides. FIG. 13 shows a 2D representation of the concept. In an application, multiple tendons are used to re-route forces and the application of force is distributed over an optimal area on top of rigid plates. Contact areas between the structures in the base layer are designed to have low friction to minimize friction losses and allow improved force transmission. The tendons are routed through a fixed sleeve (rigidly or fixedly attached). This has the advantage that there is no force transmission outside of the sleeve and the forces can be directly transmitted to where they are needed. The tendon is arranged such that it partially counteracts the pulling force F_act. All occurring forces that are not counteracting F_Act are led into the rigid plates to not increase the pressure and stress on the human body.

FIG. 13 shows a schematic view of a stack of garment layers to be used to increase joint stiffness to counteract gravity. The stack of sheets is exposed to an external pressure (P_ext) which will increase the stiffness of the stack. Due to gravity F_React applies another force to the layer stack which in turn counteracts the external force, and thus, modulates the stiffness around the joint. The layers are also used to absorb external forces in a circular structure.

What has been described above is, inter alia, without restricting the present invention or present disclosure, an apparatus for supporting a limb 10, 20 of a user against gravity, comprising at least two garment elements 101, 102, 103; 901, 902, 903 and at least one passive force element 201, 202; 1001, 1001A, 1002, 1002A attached between two adjacent of said garment elements 101, 102, 103; 901, 902, 903.

Furthermore, what has also been described above is, inter alia, without restricting the present invention or present disclosure, an apparatus, wherein the passive force elements are stretching bands or springs.

Furthermore, what has also been described above is, inter alia, without restricting the present invention or present disclosure, a corresponding apparatus, wherein the garment elements comprise constringent elements 111, 112 maintaining the associated garment element in position wherein the constringent elements 111, 112 are essentially oriented perpendicular to the longitudinal axis of the associated limb portion.

Furthermore, what has also been described above is, inter alia, without restricting the present invention or present disclosure, such an apparatus, wherein the garment elements comprise stiffness inducing plates 121 and/or glide plates provided between the user's skin and the constringent elements 111, 112 of the garment element.

Furthermore, what has also been described above is, inter alia, without restricting the present invention or present disclosure, such an apparatus, further comprising at least one active support 300 having a tendon 301; 1100, 1100A attached at one garment element 101; 903, 902 and actuated by a tensile force actuator 310; 1110, 1110A, wherein the tendon 301; 1100, 1100A is guided at least to one adjacent garment element 302, 303; 902, 903, wherein for every one tensile force actuator 310; 1110, 1110A a passive force element is present being an antagonistic passive force element to the associated tendon portion 302, 303; 1102, 1102A. Furthermore, what has also been described above is, inter alia, without restricting the present invention or present disclosure, this apparatus being preferably designed such that the tendons are guided in low friction sheaths, at least partially attached to the corresponding garment portions. Furthermore, what has also been described above is, inter alia, without restricting the present invention or present disclosure that the apparatus as described in this paragraph preferably is designed such that each tendon guided on one side of the body of the user in view of its sagittal plane for a first garment layer comprises a separated portion where two tendon portions are guided on opposite sides of the coronal plane of the associated limb to be reunited on the opposite side of said sagittal plane to be guided on the adjacent garment layer. Furthermore, what has also been described above is, inter alia, without restricting the present invention or present disclosure, such an apparatus, wherein the garment elements comprise glide plates provided between the user's skin and the tendons. Furthermore, what has also been described above is, inter alia, without restricting the present invention or present disclosure, such an apparatus, wherein the tendons or tendon portions are guided in criss-cross patterns on said glide plates. Furthermore, what has also been described above is, inter alia, without restricting the present invention or present disclosure, such an apparatus, wherein each tensile force actuator 310; 1110, 1110A is either attached at one adjacent or opposite garment layer element or a guide direction change element is attached at said adjacent or opposite garment layer element guiding the associated tendon, wherein the tensile force actuator can then be fixed at any place at the apparatus. Furthermore, what has also been described above is, inter alia, without restricting the present invention or present disclosure, such an apparatus, comprising a control unit 400 and at least a sensor 401, 402 attached to one of the garment elements, wherein the sensor 401 is configured to detect the angle 411 of the limb portion associated to said garment element in view of the vertical and/or the wherein the sensor 402 is configured to detect a movement of the limb portion associated to said garment element, wherein the control unit 400 is adapted to control 405 the at least tensile force actuator 310; 1110, 1110A to support the movement and/or the angle change of the limb portion. Furthermore, what has also been described above is, inter alia, without restricting the present invention or present disclosure, such an apparatus as indicated in the preceding sentence, wherein the control unit 400 stores, for every joint, an authorized predetermined angle interval as well as stores for the group of all joints predetermined angle intervals, and is adapted to compare the sensor 401 information 411 for all joints with said stored intervals and blocks the tensile force actuators 310; 1110, 1110A, if an angle value leaves one of the predetermined threshold intervals to avoid a fall of the user equipped with the apparatus.

Furthermore, what has also been described above is, inter alia, without restricting the present invention or present disclosure, an apparatus for supporting a limb 10, 20 of a user against gravity comprises at least two garment elements 902, 903 and at least one passive force element 1002, 1002A attached between two adjacent of said garment elements 902, 903. Preferably it further comprises at least one active support having a tendon 1100, 1100A attached at one garment element 903, 902 and actuated by a tensile force actuator 1110, 1110A, wherein the tendon 1100, 1100A is guided at least to one adjacent garment element 902, 903, wherein for every one tensile force actuator 1110, 1110A a passive force element is present being an antagonistic passive force element to the associated tendon portion 1102, 1102A.

| LIST OF REFERENCE SIGNS | |
|---|---|
| 10 | leg |
| 11 | hip |
| 12 | knee |
| 13 | ankle |
| 14 | thigh |
| 15 | shank |
| 19 | ground |
| 20 | arm |
| 21 | shoulder |
| 22 | elbow |
| 23 | wrist |
| 24 | torso |
| 25 | upper arm |
| 26 | forearm |
| 31 | upper joint |
| 32 | lower joint |

-continued

| LIST OF REFERENCE SIGNS | |
|---|---|
| 34 | upper body |
| 35 | upper limb portion |
| 36 | lower limb portion |
| 100 | garment layer |
| 101 | hip garment layer |
| 102 | thigh garment layer |
| 103 | shank garment layer |
| 111 | tensioning cable |
| 112 | tensioning cable |
| 121 | semi-rigid plate |
| 200 | passive layer |
| 201 | hip-thigh passive layer |
| 202 | thigh-shank passive layer |
| 203 | shank-foot passive layer |
| 204 | shoulder-upper arm passive layer |
| 205 | upper arm-forearm passive layer |
| 206 | forearm-hand passive layer |
| 300 | power layer |
| 301 | power layer transmission tendon |
| 302 | direction change point |
| 303 | cable hip guidance |
| 304 | hip attachment point |
| 310 | power layer unit |
| 311 | power layer path |
| 312 | covered path |
| 313 | silicone tubing |
| 321 | hip power layer transmission tendon |
| 400 | support assistance control unit |
| 401 | IMU |
| 402 | accelerometer |
| 403 | load cell |
| 404 | tendon length estimator/encoder counter |
| 405 | motor |
| 411 | angle calculation unit |
| 412 | angle calculation unit |
| 414 | joint model unit |
| 415 | adding unit |
| 416 | trunk EC compensation unit |
| 417 | compression and compensation unit |
| 418 | scaling support value unit |
| 419 | minimum force unit |
| 420 | force estimation unit |
| 421 | movement detector |
| 422 | adding Unit |
| 425 | PI control unit |
| 501 | gravity force |
| 502 | apparatus force |
| 601 | torso harness |
| 602 | elbow pad |
| 603 | wrist |
| 621 | stiffness adaptation inlet |
| 701 | shoulder stretchband |
| 703 | wrist spring |
| 801 | forearm cable guide |
| 802 | elbow cable guide |
| 803 | shoulder cable guide |
| 810 | cable actuators |
| 811 | clutch mechanism |
| 901 | body garment |
| 902 | upper limb part garment |
| 903 | lower limb part garment |
| 1001 | first passive element |
| 1001A | second passive element |
| 1002 | first passive layer |
| 1002A | second passive layer |
| 1100 | first tendon |
| 1100A | second tendon |
| 1102 | first tendon direction change |
| 1102 | second tendon direction change |
| 1110 | first actuator |
| 1110A | second actuator |

The invention claimed is:

1. A soft wearable muscle assisting device, comprising:

active and passive components;

at least a wearable body interface and attached thereon elements of the active and passive components adapted to together assist a user in changing or maintaining a position of a first body part articulated to a second body part, the wearable body interface comprising at least two garment portions, the active and passive components comprising at least one actively powered element, the passive components comprising at least a first passive component and a second passive component that both extend between the at least two garment portions and comprise elastic material for storing energy provided by at least one of the user and the at least one actively powered element, the first and a second passive component configured to be, in use, disposed on opposite sides of a joint of a body such that one of the first and second passive components is disposed in front of the joint and the other of the first and second passive components is disposed at the rear of the joint, the active component being provided with only one actuator for extending at least two joints.

2. The soft wearable muscle assisting device according to claim 1, wherein:

the wearable body interface and the active and passive components are adapted to assist a user in changing or maintaining the position of a limb articulated at the joint; and the at least two garment portions comprise at least one garment portion that in use at a position generally distal of the joint while at least one other garment portion in use is provided at a position non-distal of the joint.

3. The soft wearable muscle assisting device according to claim 1, wherein:

the first passive component is configured to exert a torque on the joint for at least a first part of possible joint angles; and the second passive component is configured to exert a torque on the joint for at least a second part of the possible joint angles, the torque of the first passive component being zero or counteracting the torque of the second passive component for at least some part of the second part of possible joint angles, a sum of torques of the first and the second passive component together providing a nonzero torque on the joint.

4. The soft wearable muscle assisting device according to claim 3, wherein the sum of torques of the first and the second passive component together provide a net joint flexion assistance.

5. The soft wearable muscle assisting device according to claim 1, wherein:

at least one active component comprises at least one actuator that is configured to assist joint extension; and wherein a passive component is provided to present a force antagonistic to the assistance of joint extension provided by the at least one active component.

6. The soft wearable muscle assisting device according to claim 1, wherein at least one active component:

at least comprises a guided tendon and an actuator adapted to together assist one of:

in changing the position of the first body part against gravity; and in supporting the first body part to maintain the position of the first body part against gravity; and is configured:

to allow the actuator to unreel the tendon for flexing of the joint; and to exert a tension on the tendon at least one of:
by the weight of the body part articulated; and
by a nonzero sum of torques on the joint provided by the first and second passive components together.

7. The soft wearable muscle assisting device according to claim 1, wherein:
at least one of the body parts that is assisted is a leg;
at least one of the active components comprises a tendon guided generally in front of the knee but generally behind the back of the hip; and
the passive elements comprise stretching bands behind the knee and stretching bands for the thigh in front of a user having the body parts.

8. The soft wearable muscle assisting device according to claim 1, wherein the at least one active component comprises at least one tendon guided on one side of the body in view of a sagittal plane of the body, then separated in two portions guided to opposite sides of the coronal plane of the joint, and then reunited into a single tendon on an opposite side of the sagittal plane.

9. The soft wearable muscle assisting device according to claim 1, wherein at least one of the at least two garment portions is arranged to fully or partially surround a limb portion, and which further comprises constringent elements configured to constrict the at least one of the at least two garment portions, at least one of:
the constringent elements are embedded into the garment portion;
the constringent elements are one of detachably and fixedly connected to the passive force components; and
the active components comprise active tendons connected to the constringent elements.

10. The soft wearable muscle assisting device according to claim 1, wherein the active components comprise tendons and actuators and which further comprises a direction change guide element configured to guide the tendons to the actuators through a direction change.

11. The soft wearable muscle assisting device according to claim 1, wherein at least one of:
the body interface comprises a plurality of layers configured to change an overall stiffness of a part of the soft wearable muscle assisting device;
the body interface comprises a plurality of layers configured to account for a change of muscle volume during muscle activation;
the plurality of layers of the body interface is configured to layer jam;
the plurality of layers of the body interface comprises inlets for layer jamming;
the body interface comprises multiple constringent elements configured to tighten automatically;
the body interface comprises multiple constringent elements perpendicular to a tendon of an active component and configured to tighten automatically; and
the body interface comprises a semi rigid anisotropic plate to transform shear forces to normal forces.

12. The soft wearable muscle assisting device according to claim 1, wherein:
the active and passive component and the wearable body interface are configured to be used in changing or maintaining a position of a first body part that is articulated to the second body part via at least two joints;
the active component is configured to change or maintain angular positions of both of the two joints; and
the active component is provided with only one actuator for changing or maintaining the angular positions of both of the joints.

13. The soft wearable muscle assisting device according to claim 1, wherein:
the active components comprise tendons; and
the tendons are guided in at least one of:
low friction sheaths, at least some of which are partially attached to at least one of the garment portions; and
the tendons are guided in slack sheaths, at least some of the slack sheaths being at least partially attached to at least one of the garment portions.

14. The soft wearable muscle assisting device according to claim 1, which further comprises:
an actuator control;
a sensor arrangement configured to generate signals indicative of at least one of:
an angle of a joint present between the first body part and the second body part;
a change in an angle of a joint present between the first and the second body part;
an absolute movement of the first body part;
a movement of the first body part relative to the second body part;
a position of the first body part; and
a pressure on a part of the body relatable to at least one of the movement of the
first body part and a position of the first body part;
the actuator control being configured to actuate the actuator in response to signals generated by the sensor arrangement.

15. The soft wearable muscle assisting device according to claim 1, wherein:
the active components comprise a tensile force actuator; and
the actuator control is:
configured to store allowed predetermined upper and lower angle values for a joint; and
configured to compare sensor information indicative of a joint angle or joint change angle with the stored upper and lower angle values to block the tensile force actuator if a value of an angle leaves an interval between the upper and lower allowed values.

16. A soft wearable muscle assisting device according to claim 1 configured to assist a user in moving at least one leg or part of one leg in at least one of walking, standing, getting up from a sitting position and sitting down, climbing a flight of stairs, descending a flight of stairs, the device further comprising:
a sensor arrangement configured to generate at least one signal indicative of at least one of:
an angle of a joint present between a first body part and a second body part;
a change in an angle of a joint present between the first and the second body part;
an absolute movement of the first body part;
a movement of the first body part relative to the second body part;
a position of the first body part; and
a pressure on a part of the body relatable to at least one of the movement of the first body part and a position of the first body part for each of the legs of the user; and the at least one actively powered element being an actuator for the at least one leg; and an actuator control configured to actuate the actuator for the at least one leg in response to signals derived from both of the at least one leg and a second leg of the user.

17. The soft wearable muscle assisting device according to claim 16 adapted to assist a user in moving at least one leg or part of one leg in at least one of walking, getting up from a sitting position and sitting down, climbing a flight of stairs, and descending a flight of stairs, wherein:

the sensor arrangement is configured to provide one of:

at least five values of signal information, the five values being spaced apart by at least 5 ms; and at least ten values of signal information, the ten values each spaced apart by at least 10 ms; and the actuator control is configured to control the actuator in a manner such that power is provided to the actuator during one of:

at least 30%;

at least 40%; and at least 50%, of at least one of a swing cycle, a get up period, and a sitting down period.

18. The soft wearable muscle assisting device according to claim 16, which further comprises first and second passive elements disposed on opposite sides of the joint in a ligament-like manner.

19. The soft wearable muscle assisting device according to claim 1, which further comprises:

a base layer being a garment like layer comprising at least two garment elements;

the active and passive components together assist a user in changing or maintaining a position of the first body part articulated to the second body part, the active and passive components comprising elements attached to the base layer, the active components having a sheath, at least one tendon guided in the sheath, the sheath attached at least for a part of its length at the base layer and the sheath being slack;

a passive layer comprising at least a passive element that connects the at least two garment elements , the passive element comprising elastic material configured to store a portion of energy provided by at least one of the user and by the active component, the active and passive elements arranged on opposite sides of a joint adjacent the body part, stabilizing the joint in a ligament-like manner, and acting in an antagonistic manner.

20. A soft wearable muscle assisting device according to claim 1, further comprising:

at least one element controllable via electrical signals during assistance to a user;

a sensor component configured to provide signals indicative of a need of a user for assistance, a control configured to provide electrical signals during assistance to a user in response to signals provided by the sensor component and indicative of a need of the user for assistance;

the sensor component comprises at least a first sensor and a second sensor both configured to provide sensor signals indicative of at least one of:

an absolute orientation of a limb or a part of a limb;

an orientation of a limb or part of a limb relative to another part of a body;

a joint angle; and at least one of a position, a velocity, and an acceleration of a body part;

the first and second sensors spaced apart from each other such that, in use, one of:

at least one joint is present between the first and second sensor; and the first and second sensors are provided at neighboring joints;

a signal conditioning circuit is provided to input at least two streams of respective sensor signals into the control, the first stream of sensor signals providing, during a cycle of movements of a body part, at least ten different values temporally of sensor signals in response to sensor signals from the first sensor and the second stream of sensor signals providing, during a cycle of movements of a body part, at least ten different spaced apart values of sensor signals in response to sensor signals from the second sensor; and the control being configured:

to identify a current need for assistance in response to the at least two streams of sensor signals by evaluating, during the cyclic movement, a plurality of values from both streams; and at least one of:

to generate activation signals for muscle assisting actuators during at least 10% of the movement cycle time;

at least two different levels of at least one of activation and of assistance; and at least four different levels of at least one of activation and of assistance.

* * * * *